United States Patent
Bagherinia et al.

(10) Patent No.: US 10,636,145 B2
(45) Date of Patent: *Apr. 28, 2020

(54) SYSTEMS AND METHODS FOR REDUCING ARTIFACTS IN OCT ANGIOGRAPHY IMAGES

(71) Applicant: Carl Zeiss Meditec, Inc., Dublin, CA (US)

(72) Inventors: Homayoun Bagherinia, Oakland, CA (US); Nathan D. Shemonski, San Francisco, CA (US)

(73) Assignee: CARL ZEISS MEDITEC, INC., Dublin, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/522,192

(22) Filed: Jul. 25, 2019

(65) Prior Publication Data

US 2019/0347797 A1 Nov. 14, 2019

Related U.S. Application Data

(63) Continuation of application No. 15/292,432, filed on Oct. 13, 2016, now Pat. No. 10,402,965.

(Continued)

(51) Int. Cl.
*G06T 7/00* (2017.01)

(52) U.S. Cl.
CPC .. *G06T 7/0012* (2013.01); *G06T 2207/10101* (2013.01); *G06T 2207/30041* (2013.01)

(58) Field of Classification Search
CPC ......... G06T 7/0012; G06T 2207/10101; G06T 2207/30041
See application file for complete search history.

(56) References Cited

U.S. PATENT DOCUMENTS

| | | | |
|---|---|---|---|
| 7,301,644 B2 | 11/2007 | Knighton et al. | |
| 8,332,016 B2 | 12/2012 | Stetson | |

(Continued)

FOREIGN PATENT DOCUMENTS

WO 2017/050863 A1 3/2017

OTHER PUBLICATIONS

Liew, Yih Miin, et al. "In vivo assessment of human burn scars through automated quantification of vascularity using optical coherence tomography." Journal of biomedical optics 18.6 (2012): 061213. (Year: 2012).*

(Continued)

*Primary Examiner* — Nirav G Patel
(74) *Attorney, Agent, or Firm* — Morrison & Foerster LLP

(57) ABSTRACT

Various methods for reducing artifacts in OCT images of an eye are described. In one exemplary method, three dimensional OCT image data of the eye is collected. Motion contrast information is calculated in the OCT image data. A first image and a second image are created from the motion contrast information. The first and the second images depict vasculature information regarding one or more upper portions and one or more deeper portions, respectively. The second image contains artifacts. Using an inverse calculation, a third image is determined that can be mixed with the first image to generate the second image. The third image depicts vasculature regarding the same one or more deeper portions as the second image but has reduced artifacts. A depth dependent correction method is also described that can be used in combination with the inverse problem based method to further reduce artifacts in OCT angiography images.

22 Claims, 17 Drawing Sheets

Related U.S. Application Data

(60) Provisional application No. 62/254,972, filed on Nov. 12, 2015.

(56) References Cited

U.S. PATENT DOCUMENTS

| | | | |
|---|---|---|---|
| 9,332,902 | B2 | 5/2016 | Tumlinson et al. |
| 2008/0025570 | A1 | 1/2008 | Fingler et al. |
| 2010/0027857 | A1 | 2/2010 | Wang |
| 2012/0307014 | A1 | 12/2012 | Wang |
| 2013/0176532 | A1 | 7/2013 | Sharma et al. |
| 2016/0040977 | A1 | 2/2016 | An et al. |

OTHER PUBLICATIONS

Arnold et al., "Noise Analysis of a Digital Radiography System", American Journal of Roentgenology, vol. 142, Mar. 1984, pp. 609-613.

Ford et al., "Video-Rate Imaging of Microcirculation with Single-Exposure Oblique Back-Illumination Microscopy", Journal of Biomedical Optics, vol. 18, No. 6, Jun. 2013, pp. 066007-1-066007-8.

Liu et al., "Motion Analysis and Removal in Intensity Variation Based OCT Angiography", Biomedical Optics Express, vol. 5, No. 11, Nov. 1, 2014, pp. 3833-3847.

Zhang et al., "Methods and Algorithms for Optical Coherence Tomography-Based Angiography: A Review and Comparison", Journal of Biomedical Optics, vol. 20, No. 10, Oct. 2015, pp. 100901-1-100901-13.

An et al., "In Vivo Volumetric Imaging of Vascular Perfusion within Human Retina and Choroids with Optical Micro-Angiography", Optics Express, vol. 16, No. 15, Jul. 21, 2008, pp. 11438-11452.

Blazkiewicz et al., "Signal-to-Noise Ratio Study of Full-Field Fourier-Domain Optical Coherence Tomography", Applied Optics, vol. 44, No. 36, Dec. 20, 2005, pp. 7722-7729.

Enfield et al., "In Vivo Imaging of the Microcirculation of the Volar Forearm using Correlation Mapping Optical Coherence Tomography (cmOCT)", Biomedical Optics Express, vol. 2, No. 5, May 1, 2011, pp. 1184-1193.

Fingler et al., "Mobility and Transverse Flow Visualization using Phase Variance Contrast with Spectral Domain Optical Coherence Tomography", Optics Express, vol. 15, No. 20, Oct. 1, 2007, pp. 12636-12653.

Hillmann et al., "Holoscopy-Holographic Optical Coherence Tomography", Optics Letters, vol. 36, No. 13, Jul. 1, 2011, pp. 2390-2392.

Hyvarinen et al., "Independent Component Analysis: Algorithms and Applications", Neural Networks, vol. 13, No. 4-5, 2000, pp. 411-430.

Jia et al., "Quantitative Optical Coherence Tomography Angiography of Choroidal Neovascularization in Age-Related Macular Degeneration", American Academy of Ophthalmology, vol. 121, No. 7, Jul. 2014, pp. 1435-1444.

Jia et al., "Split-Spectrum Amplitude-Decorrelation Angiography with Optical Coherence Tomography", Optics Express, vol. 20, No. 4, Feb. 13, 2012, pp. 4710-4725.

Mariampillai et al., "Speckle Variance Detection of Microvasculature using Swept-Source Optical Coherence Tomography", Optics Letters, vol. 33, No. 13, Jul. 1, 2008, pp. 1530-1532.

Nakamura et al., "High-Speed Three-Dimensional Human Retinal Imaging by Line-Field Spectral Domain Optical Coherence Tomography", Optics Express, vol. 15, No. 12, Jun. 11, 2007, pp. 7103-7116.

Non-Final Office Action received for U.S. Appl. No. 15/292,432, dated Oct. 26, 2018, 8 pages.

Notice of Allowance received for U.S. Appl. No. 15/292,432, dated Apr. 22, 2019, 5 pages.

Spaide et al., "Image Artifacts in Optical Coherence Tomography Angiography", Retina, vol. 35, No. 11, 2015, pp. 2163-20180.

Supplemental Notice of Allowance received for U.S. Appl. No. 15/292,432, dated Jun. 12, 2019, 2 pages.

Zhang et al., "Minimizing Projection Artifacts for Accurate Presentation of Choroidal Neovascularization in OCT Micro-Angiography", Biomedical Optics Express, vol. 6, No. 10, Oct. 1, 2015, pp. 4130-4143.

Zhang et al., "Projection-Resolved Optical Coherence Tomographic Angiography", Biomedical Optics Express, vol. 7, No. 3, Mar. 1, 2016, pp. 816-828.

* cited by examiner

SYSTEMS AND METHODS FOR REDUCING ARTIFACTS IN OCT ANGIOGRAPHY IMAGES

PRIORITY

This application is a continuation application of U.S. application Ser. No. 15/292,432, filed Oct. 13, 2016, which claims priority to U.S. Provisional Application Ser. No. 62/254,672 filed Nov. 12, 2015, the contents of each of which is hereby incorporated by reference.

BACKGROUND

Optical coherence tomography (OCT) is a noninvasive, noncontact imaging modality that uses coherence gating to obtain high-resolution cross-sectional images of tissue microstructure. Several implementations of OCT have been developed. In frequency domain OCT (FD-OCT), the interferometric signal between light from a reference and the back-scattered light from a sample point is recorded in the frequency domain typically either by using a dispersive spectrometer in the detection arm in the case of spectral-domain OCT (SD-OCT) or rapidly tuning a swept laser source in the case of swept-source OCT (SS-OCT). After a wavelength calibration, a one-dimensional Fourier transform is taken to obtain the scattering profile of a sample along the OCT beam. Each scattering profile is called an axial scan, or A-scan. Cross-sectional images, called B-scans, and by extension 3D volumes, are built up from many A-scans, with the OCT beam illuminating a set of transverse locations on the sample either by scanning or field illumination.

Functional OCT can provide important clinical information that is not available in the typical intensity based structural OCT images. There have been several functional contrast enhancement methods including Doppler OCT, Phase-sensitive OCT, Polarization Sensitive OCT, Spectroscopic OCT, etc. Integration of functional extensions can greatly enhance the capabilities of OCT for a range of applications in medicine.

One of the most promising functional extensions of OCT has been the field of OCT angiography which is based on flow or motion contrast between repeated structural OCT measurements. A variety of OCT Angiography techniques have been developed including but not limited to optical microangiography (OMAG), speckle variance, phase variance, correlation mapping, and decorrelation (see for example US Patent Publication No. 2008/0025570, US Patent Publication No. 2010/0027857, US Patent Publication No. 2012/0307014, Fingler et al. "Mobility and transverse flow visualization using phase variance contrast with spectral domain optical coherence tomography" Opt. Express 2007; 15:12636-53, Mariampillai et al., "Speckle variance detection of microvasculature using swept-source optical coherence tomography", Optics Letters 33(13), 1530-1533, 2008, An et al., "In vivo volumetric imaging of vascular perfusion within human retina and choroids with optical micro-angiography," Opt. Express 16(15), 11438-11452, 2008, Enfield et al., "In vivo imaging of the microcirculation of the volar forearm using correlation mapping optical coherence tomography" (cmOCT), Biomed. Opt. Express2(5), 1184-1193, 2011, and Jia et al. "Split-spectrum amplitude decorrelation angiography with optical coherence tomography" Optics Express 20(4) 4710-4725 (2012), the contents of all of which are hereby incorporated by reference). These techniques use the OCT data to achieve the imaging of functional vascular networks within microcirculatory tissue beds in vivo, without the use of exogenous contrast agents.

The key point of OCT angiography processing methods is to extract localized signal variations from the bulk motion signal of a background tissue by comparing OCT signals, such as B-scans, captured at different closely-spaced time points (inter-frame change analysis). Processing can be carried out on the complex OCT data (complex-based), the amplitude or intensity portion of the OCT data (intensity-based), or the phase portion of the data (phase-based). The separately processed intensity and phase information can also be combined in some approaches. One of the major applications of flow contrast techniques (e.g., intensity-based, phase-based, complex-based, etc.) has been to generate en face vasculature images of the retina (angiogram). High resolution en face visualization based on inter-frame change analysis requires high density of sampling points and hence the time required to finish such scans can be up to an order of magnitude higher compared to regular cube scans used in commercial OCT systems.

While OCT angiography appears to be an exciting technology, there are several technical limitations that need to be overcome before it can gain widespread acceptance in clinical settings. One of the major limitations of OCT angiography is the long acquisition times and associated motion artifacts that can affect analysis. US Patent Publication No. 2013/0176532 and International Application No. PCT/EP2016/072493, both of which are hereby incorporated by reference, describe some methods for dealing with motion artifacts in OCT Angiography data.

Another limitation with OCT angiography technology is the occurrence of projection or decorrelation tail artifacts in the OCT angiography images. Light passing through a blood vessel can be reflected, refracted, or absorbed. The light reflected from blood moving in the vessels forms the basis of optical coherence tomography angiography (OCTA). However, the light that has passed through moving blood also encounters tissue below the blood vessel. When this light strikes the deeper layers in the eye, such as the retinal pigment epithelium (RPE) layer of retina, it is reflected back to the OCT instrument. The light that has passed through the blood vessels changes over time, and so the reflected portion of this light is detected as having a decorrelation resembling blood flow. Therefore, the RPE will seem to have blood vessels that have the pattern of the overlying retinal blood vessels. This effect is referred to as the OCTA projection artifact. OCTA projection artifacts also occur from superficial retinal vessels, which can be seen in deeper retinal layers, or retinal and choroidal vessels which can be even seen deep in the sclera. OCTA projection artifacts are nearly always present and seen in any structure that is located below vasculature.

Previous methods that are used to reduce the projection artifacts include:

1) Subtracting an angiogram generated based on deeper layers from the angiogram generated from the superficial layers directly after some preprocessing steps. In this method, a true angiographic image for the subretinal space can be obtained by a simple subtraction of a scaled image obtained from the retinal space from the image obtained from the subretinal space (see for example, Zhang, Anqi, Qinqin Zhang, and Ruikang K. Wang. "Minimizing projection artifacts for accurate presentation of choroidal neovascularization in OCT micro-angiography." *Biomedical Optics Express* 6.10 (2015):

2) Removing flow projection artifacts from superficial retinal blood vessels to the outer retina by first generating a binary large inner retinal vessel map based on applying a 30×30 pixel Gaussian filter. This filter removed small inner retinal vessels and masked the outer retina flow map, thus enabling the subtraction of large vessel projections. A binary outer retinal flow map was then generated by applying a 10×10 pixel Gaussian filter to remove remaining noise and mask the outer retinal flow map again to obtain a clear map. After these artifacts are removed by the mask subtraction operation, there were no longer any flow artifacts in the normally avascular outer retina (see for example, Jia, Yali, et al. "Quantitative optical coherence tomography angiography of choroidal neovascularization in age-related macular degeneration."*Ophthalmology* 121.7 (2014): 1435-1444).

Here we describe a new mathematically sound approach for removing the flow projection artifacts based on an inverse problem estimation framework.

SUMMARY

According to one aspect of the subject matter described in the present application, a method for reducing artifacts in OCT angiography images of the eye may include collecting three dimensional OCT image data of the eye; calculating motion contrast information in the three dimensional OCT image data using an OCT angiography processing technique; creating a first image and a second image from the motion contrast information, the first image depicting vasculature information regarding one or more upper portions and the second image depicting vasculature information regarding one or more deeper portions, said second image containing artifacts; using an inverse calculation, determining a third image that can be mixed with the first image to generate the second image, said third image depicting vasculature regarding the same one or more deeper portions as the second image but having reduced artifacts; and storing or displaying the third image with the reduced artifacts or a further analysis thereof. In some embodiments, the inverse calculation can be multiplicative or additive.

This artifact removal approach described in the present application is particularly advantageous in a number of respects. By way of example and not limitation, (1) it is a mathematically sound approach within an inverse problem estimation framework, (2) the approach involves minimal implementation (e.g., software/hardware wise) to perform the functionality described herein, which makes it computationally fast and inexpensive, (3) it does not use a pipeline of image processing steps that may depend on a series of parameters, and (4) the degree of artifacts removal or reduction can be controlled.

According to another aspect of the subject matter described in the present application, that can be used alone or in combination with the inverse calculation based artifact approach, a method to reduce artifacts in optical coherence tomography (OCT) angiography images of a sample may include collecting a first set of OCT image data and a second set of OCT image data with an OCT system, said first set and the second set containing data taken at approximately the same location on the sample; splitting the first set of data and the second set of data into multiple regions of interest, said regions of interest of each set corresponding to approximately the same location on the sample; generating a depth-dependent correction map by calculating one or more of motion and intensity changes for each pair of regions from the first set and the second set; applying the depth-dependent correction map to the first set of data or the second set of data to correct one or more non-uniform changes along the z dimension; and applying an OCT angiography processing technique on the first set of data and the second set of data to generate one or more OCT angiography images, said one or more OCT angiography images having reduced artifacts.

Further aspects include various additional features and operations associated with the above and following aspects and may further include, but are not limited to corresponding systems, methods, apparatus, and computer program products.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the inventive subject matter.

DETAILED DESCRIPTION

All patent and non-patent references cited within this specification are herein incorporated by reference in their entirety to the same extent as if the disclosure of each individual patent and non-patent reference was specifically and individually indicated to be incorporated by reference in its entirety.

Example OCT System

Figure 1:
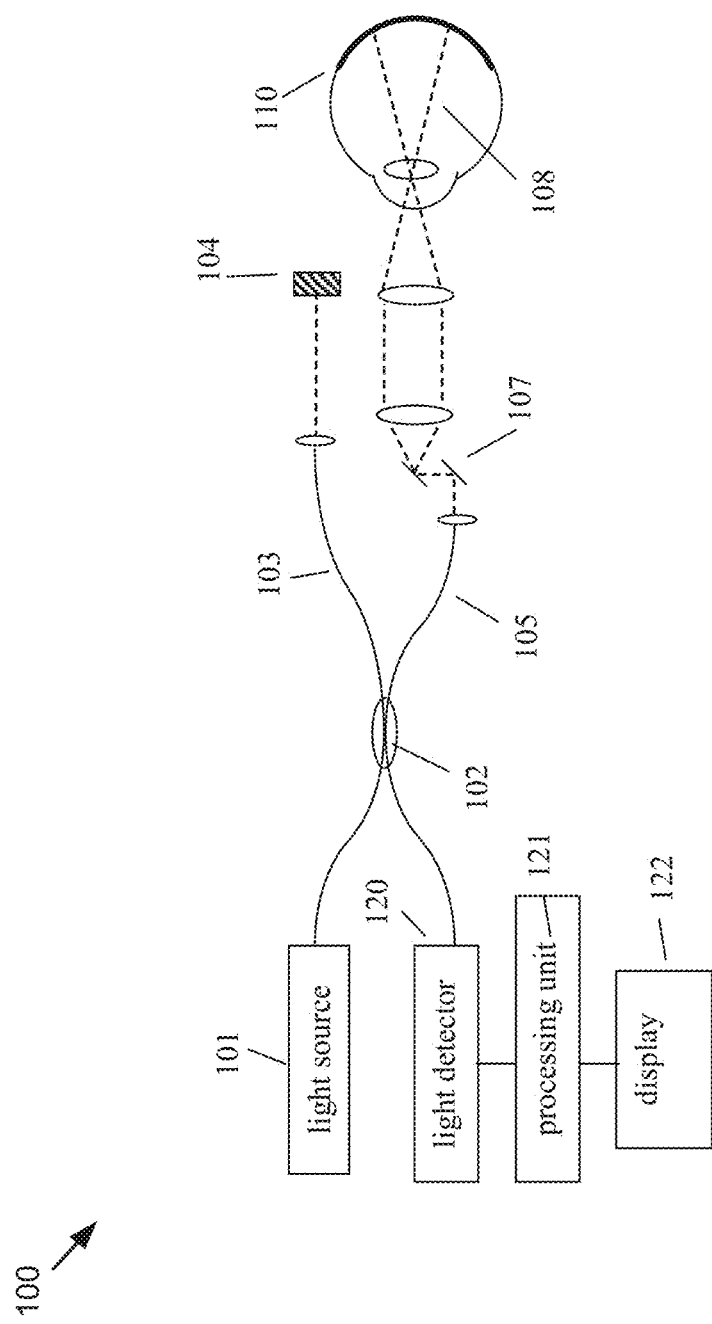
FIG. 1 is a generalized optical coherence tomography (OCT) system.

A generalized FD-OCT system used to collect 3-D image data of the eye suitable for use with the present invention is illustrated in FIG. 1. An FD-OCT system 100 includes a light source, 101, typical sources including but not limited to broadband light sources with short temporal coherence lengths or swept laser sources. A beam of light from source 101 is routed, typically by optical fiber 105, to illuminate the sample 110, a typical sample being tissues in the human eye. The source 101 can be either a broadband light source with short temporal coherence length in the case of SD-OCT or a wavelength tunable laser source in the case of SS-OCT. The light is scanned, typically with a scanner 107 between the output of the fiber and the sample, so that the beam of light (dashed line 108) is scanned laterally (in x and y) over the region of the sample to be imaged. Light scattered from the sample is collected, typically into the same fiber 105 used to route the light for illumination. Reference light derived from the same source 101 travels a separate path, in this case involving fiber 103 and retro-reflector 104 with an adjustable optical delay. Those skilled in the art recognize that a transmissive reference path can also be used and that the adjustable delay could be placed in the sample or reference arm of the interferometer. Collected sample light is combined with reference light, typically in a fiber coupler 102, to form light interference in a detector 120. Although a single fiber port is shown going to the detector, those skilled in the art recognize that various designs of interferometers can be used for balanced or unbalanced detection of the interference signal. The output from the detector 120 is supplied to a processor 121 that converts the observed interference into depth information of the sample. The results can be stored in the processor 121 or other storage medium or displayed on display 122. The processing and storing functions may be localized within the OCT instrument or functions may be performed on an external processing unit (e.g., the computer system 1000 shown in FIG. 10) to which the collected data is transferred. This unit could be dedicated to data processing or perform other tasks which are quite general and not dedicated to the OCT device. The processor 121 may contain for example a field-programmable gate array (FPGA), a digital signal processor (DSP), an application specific integrated circuit (ASIC), a graphics processing unit (GPU), a system on chip (SoC) or a combination thereof, that performs some, or the entire data processing steps, prior to passing on to the host processor or in a parallelized fashion.

The sample and reference arms in the interferometer could consist of bulk-optics, fiber-optics or hybrid bulk-optic systems and could have different architectures such as Michelson, Mach-Zehnder or common-path based designs as would be known by those skilled in the art. Light beam as used herein should be interpreted as any carefully directed light path. Instead of mechanically scanning the beam, a field of light can illuminate a one or two-dimensional area of the retina to generate the OCT data (see for example, U.S. Pat. No. 9,332,902; D. Hillmann et al, "Holoscopy—holographic optical coherence tomography" *Optics Letters* 36(13): 2390 2011; Y. Nakamura, et al, "High-Speed three dimensional human retinal imaging by line field spectral domain optical coherence tomography" *Optics Express* 15(12):7103 2007; Blazkiewicz et al, "Signal-to-noise ratio study of full-field Fourier-domain optical coherence tomography" *Applied Optics* 44(36):7722 (2005)). In time-domain systems, the reference arm needs to have a tunable optical delay to generate interference. Balanced detection systems are typically used in TD-OCT and SS-OCT systems, while spectrometers are used at the detection port for SD-OCT systems. The invention described herein could be applied to any type of OCT system. Various aspects of the invention could apply to other types of ophthalmic diagnostic systems and/or multiple ophthalmic diagnostic systems including but not limited to fundus imaging systems, visual field test devices, and scanning laser polarimeters.

In Fourier Domain optical coherence tomography (FD-OCT), each measurement is the real-valued spectral interferogram ($S_j(k)$). The real-valued spectral data typically goes through several postprocessing steps including background subtraction, dispersion correction, etc. The Fourier transform of the processed interferogram, results in a complex valued OCT signal output $A_j(z)=|A_j|e^{i\varphi}$. The absolute value of this complex OCT signal, $|A_j|$, reveals the profile of scattering intensities at different path lengths, and therefore scattering as a function of depth (z-direction) in the sample. Similarly, the phase, $\varphi_j$ can also be extracted from the complex valued OCT signal. The profile of scattering as a function of depth is called an axial scan (A-scan). A set of A-scans measured at neighboring locations in the sample produces a cross-sectional image (tomogram or B-scan) of the sample. A collection of B-scans collected at different transverse locations on the sample makes up a data volume or cube. For a particular volume of data, the term fast axis refers to the scan direction along a single B-scan whereas slow axis refers to the axis along which multiple B-scans are collected. We use the term "cluster scan" herein to refer to a single unit or block of data generated by repeated acquisitions at the same location for the purposes of analyzing motion contrast. A cluster scan can consist of multiple A-scans or B-scans collected with relatively short time separations at approximately the same location(s) on the sample. A variety of ways to create B-scans are known to those skilled in the art including but not limited to along the horizontal or x-direction, along the vertical or y-direction, along the diagonal of x and y, or in a circular or spiral pattern. The majority of the examples discussed herein refer to B-scans in the x-z dimensions but the invention would apply equally to any cross sectional image.

The OCT system may use any one of a number of OCT Angiography processing algorithms on one or more cluster scans of OCT data collected at the same or approximately the same transverse locations on a sample at different times. As previously mentioned, motion contrast algorithms can be applied to the intensity information derived from the image data (intensity-based algorithm), the phase information from the image data (phase-based algorithm), or the complex image data (complex-based algorithm). An en face vasculature image is an image displaying motion contrast signal in which the data dimension corresponding to depth is displayed as a single representative value, typically by summing or integrating all or an isolated portion of the data.

The OCT system discussed herein may provide 2D (i.e. cross-sectional) images, en-face images, 3-D images, metrics related to a health condition, and the like. This system may be used with any other system. For example, the OCT system may be used with a surgical system or surgical microscope system for diagnostic or treatment purposes. The OCT system may be used to analyze any sample. For example, the OCT system may be used in analysis, e.g. formation of images, of, for example, any type of life forms and inanimate objects. Examples of life forms may be animals, plants, cells or the like.

Decorrelation Artifacts Removal Approach

As discussed elsewhere herein, optical coherence tomography angiography (OCTA) is prone to decorrelation tail artifacts due to the high scattering property of blood within overlying patent vessels, creating artifacts that interfere with the interpretation of retinal angiographic results. In other words, deeper layers may have projection artifacts due to fluctuating shadows cast by flowing blood in large inner retinal vessels above them that may cause variation in the reflected signal. This signal variation is detected as a decorrelation and cannot be differentiated from true flow.

One of the steps in a standard OCT angiography algorithm involves producing 2D angiography vasculature images (angiograms) of different regions or slabs of the tissue along the depth dimension from the obtained flow contrast images, which may help a user to visualize vasculature information from different retinal layers. A slab image can be generated by summing, integrating, taking the minimum or maximum value or other techniques to determine or select a single representative value of the cube motion contrast data along a particular axis between two layers (see for example U.S. Pat. Nos. 7,301,644 and 8,332,016, the contents of both of which are hereby incorporated by reference). The slabs that are most affected by decorrelation tail artifacts may include, for example, Deeper Retinal Layer (DRL), Avascular Retinal Layer (ARL), Choriocapillaris Layer (CC), and any custom slabs, especially the ones that contain the RPE.

Figure 2:
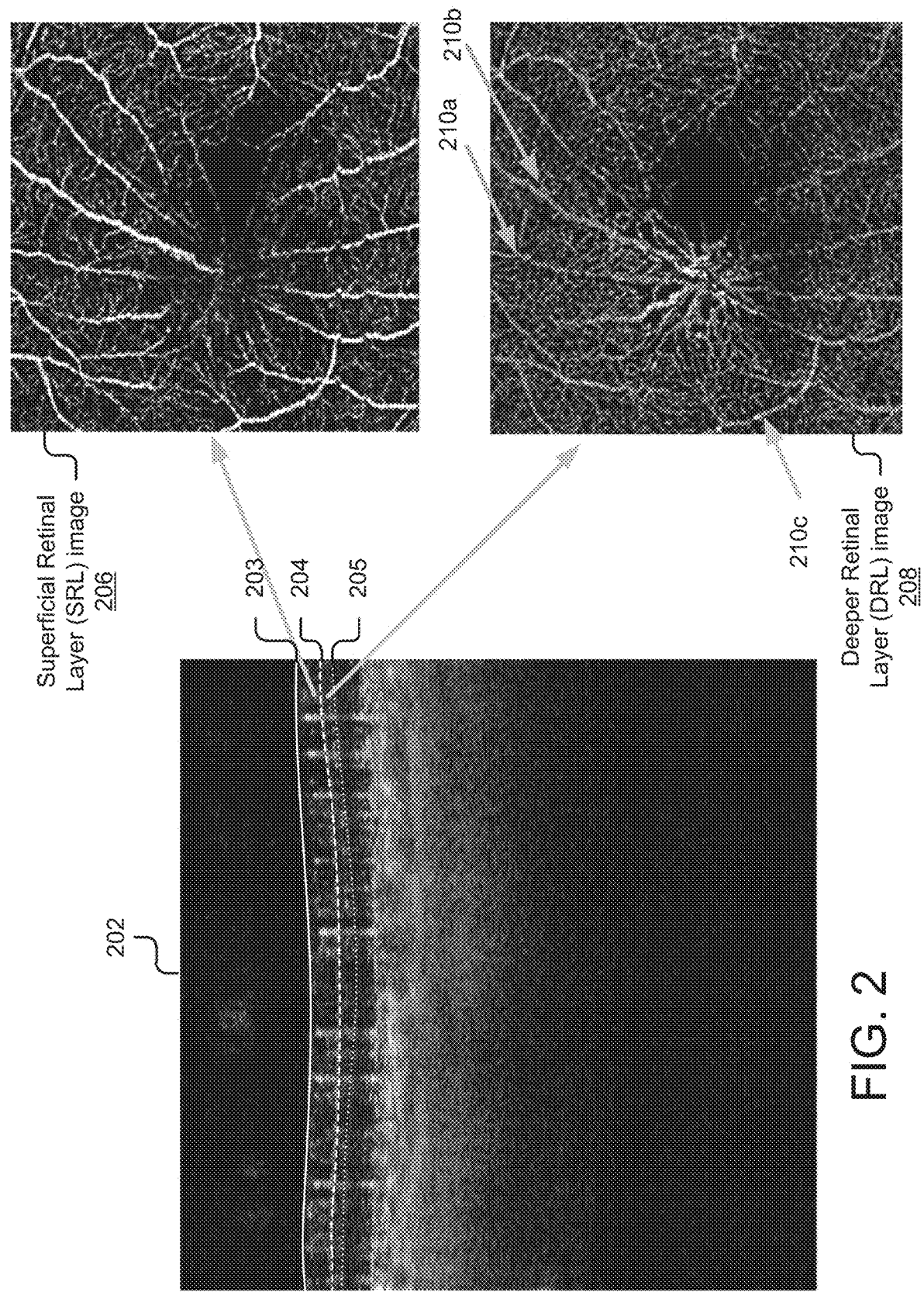
FIG. 2 illustrates segmentation of an OCT angiographic data (B-scan) to produce a superficial retinal layer image and a deeper retinal layer image.

FIG. 2 show exemplary images of a superficial retinal layer (SRL) 206 and a deeper retinal layer (DRL) 208 generated as a result of segmenting OCT angiographic data, having a representative B-scan 202. The segmented B-scan 202 shows the inner limiting membrane (ILM), as indicated by reference numeral 203, the inner plexiform layer (IPL), as indicated by reference numeral 204, and the outer plexiform layer (OPL), as indicated by reference numeral 205. The upper slab image (SRL) 206 is the result of the summation of the motion contrast data between the ILM 203 and the IPL 204. The lower slab image (DRL) 208 is the result of the summation of the motion contrast data between the IPL 204 and the OPL 205. As depicted, the decorrelation tail effect, as indicated for example by reference numerals 210*a-c*, is visible in the image of the DRL 208. The large vessels in the SRL image 206 appear in DRL image 208 as weaker vessel artifacts.

It is an object of the present invention to develop an approach that can reduce the decorrelation artifacts occurring in vasculature slab images for better visualization and interpretation. It has been observed that reducing the decorrelation tail artifacts based on the two slab images (e.g., an upper slab image and a lower slab image) may lead to a more practical solution than reducing the decorrelation tail artifacts by directly processing the OCT volume data, which includes a large number of B-scans.

Figure 4A:
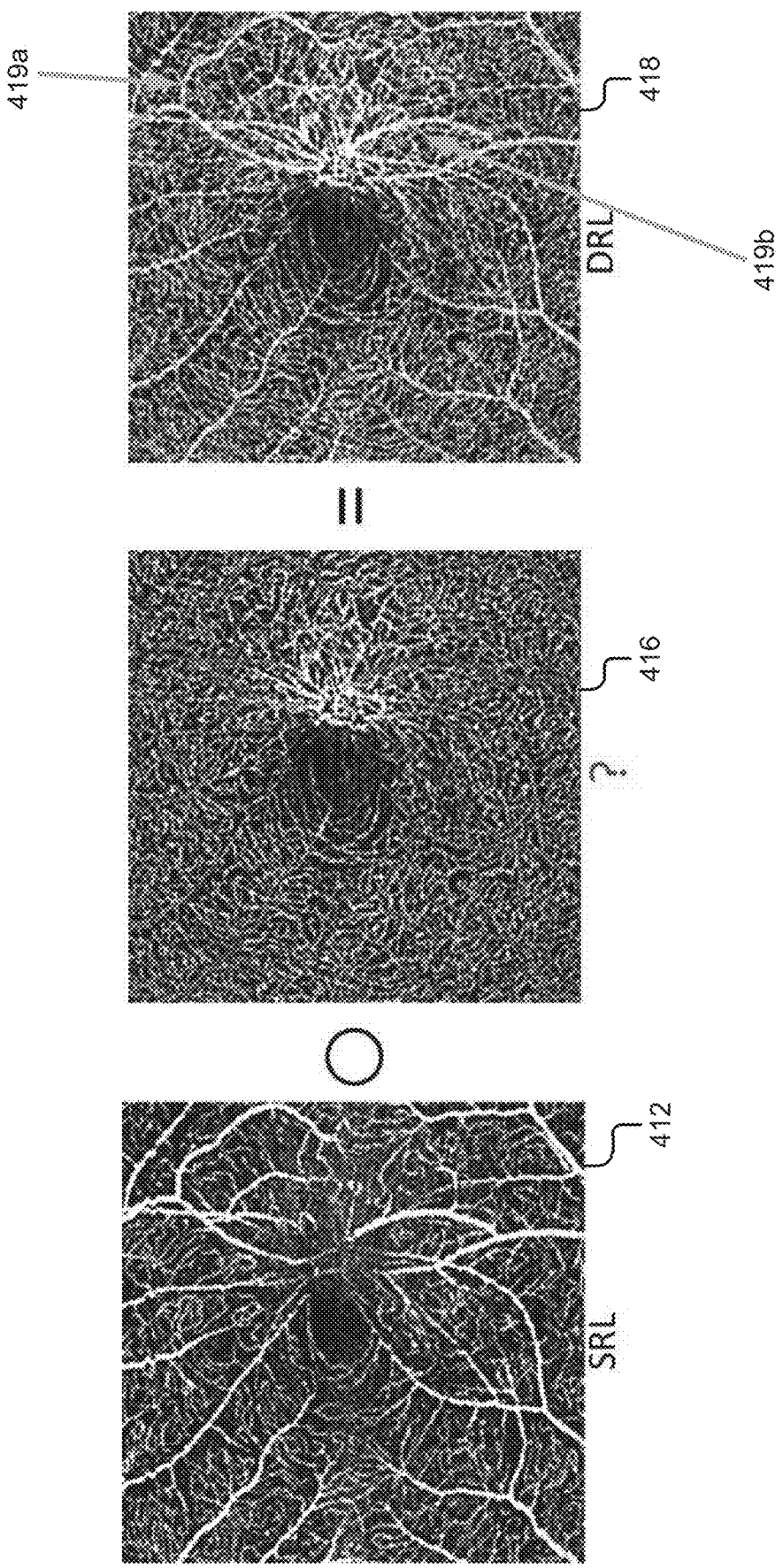
FIG. 4A illustrates an example of producing an artifact reduced image based on solving an inverse problem.

In the inverse problem approach discussed here, it is assumed that a lower slab image (generated from a deeper layer) is generated by mixing an upper slab (entire or a sub-volume above the lower layer) and the lower slab image without decorrelation tail artifacts (the unknown image to reconstruct), as shown and discussed in detail below with respect to FIG. 4A. Deeper, lower, upper and above are used herein in reference to the tissue's relationship to the probe beam. A tissue (layer) is considered deeper or lower than another tissue (layer) if the probe beam passes through it after passing through the first tissue (layer). Two common mixing models can be considered for solving this inverse problem. These models may include:

Multiplicative Model:

In this model, each pixel of the lower slab image is assumed to be generated as a result of a weighted multiplication of the upper slab image with the true lower slab image (pixelwise). The number of unknowns for this model is m×n which can be still considered as a large scale problem. A multiplicative model creates a linear system of equations.

Additive Model:

1) In this model, each pixel of the lower slab image is assumed to be generated as a weighted average of the upper slab image pixel with the true lower slab image pixel. This model is a complicated model as the number of unknowns (weights for pixels of upper slab and the pixel values of the unknown image) is equal to 2×m×n where m and n are the number of rows and columns of a slab image.

2) Alternatively, if it is assumed that each pixel of lower slab image is generated as a result of weighting the upper slab image pixel and then adding it with the true lower slab image pixel, the number of unknowns (a weight for pixels of upper slab and the pixel values of the unknown image) is equal to m×n+1 where m and n are the number of rows and columns of a slab image. This model is a simpler model than the model discussed above.

It should be understood that the following passages describe approaches for reducing artifacts based on multiplicative and additive mixing, however the present invention is not limited and/or restricted to reduce artifacts based on these mixing models and that other mixing models including, but not limited to, a combination of the additive and multiplicative mixing, and a complicated mixing are also possible and are within the scope of the present disclosure.

Example Method for Artifacts Reduction

Figure 3:
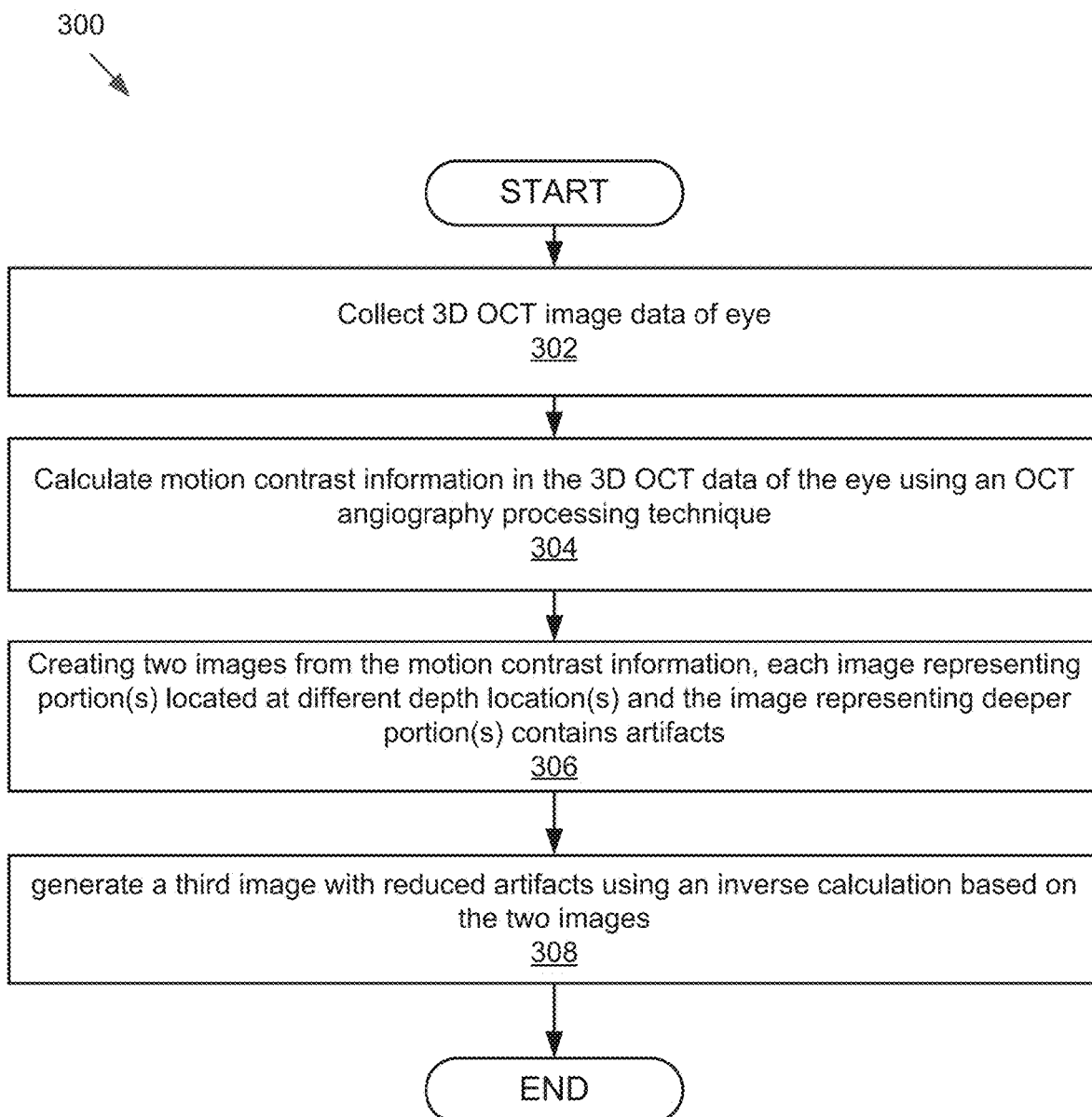
FIG. 3 is a flowchart of an example method for artifacts removal in OCT angiography image data according to one aspect of the present invention.

FIG. 3 is a flowchart of an example method 300 for artifacts removal in OCT angiography image data. It should be understood that the method 300 is not limited to the steps and/or operations embodied by this method and that other steps and/or operations are also possible and are within the scope of the present disclosure. The method 300 begins by collecting 302 three-dimensional OCT image data of the eye. The three-dimensional OCT image data may include multiple B-scans taken at each location on a particular region of the eye. The method 300 may then calculate 304 motion contrast information in the three-dimensional OCT image data using an OCT angiography (OCTA) processing technique. The OCTA processing technique may include, without limitation, an intensity-based processing technique, a phase-based processing technique, a combination of the intensity-based and phase-based techniques, and a complex-based processing technique.

Next, in block 306, the method 300 may create two images from the motion contrast information, for example the images 206 and 208 as shown in FIG. 2. These two images may be created by segmenting the motion contrast information to identify different retinal layers located at different depth locations in the eye. In some embodiments, the images that are created are slab images that depict vasculature information for different portions of the data, e.g. between different layers of the retina. The different portions are located at different depth locations in the eye. Out of the two images, the image or slab image that depicts vasculature information regarding one or more deeper portions may contain artifacts. The method 300 may reduce or eliminate these artifacts by generating 308 a third image using an inverse calculation (e.g., Eq (3), Eq (5), Eq (6), and/or Eq (7) discussed below) based on the two images. The inverse calculation can be solved by the multiplicative or additive mixing approach as discussed later below. The third image contains the one or more deeper portions but with reduced artifacts. It should be understood that the method 300 can also be applied to other ways to isolate different portions of data within the eye for artifacts removal. Also it should be understood that the two images can contain overlapping portions or regions. In some embodiments, the operations in the blocks 302-308 can be performed by the artifacts removal module 1006 (see FIG. 10) of the computer system 1000.

Multiplicative Mixing Artifacts Reduction Approach

Taking the case of multiplicative mixing, the decorrelation tail artifacts reduction problem can be formulated as an inverse problem. The goal is to reconstruct an unknown image with reduced artifacts given an upper slab or upper layer(s) image and a lower slab or deeper layer(s) image. FIG. 4A depicts such an inverse problem scenario where an estimated unknown image 416 with reduced artifacts is generated given the upper slab (SRL) image 412 and the lower slab (DRL) image 418 having artifacts (e.g., artifacts 419a and 419b). This formulation can be written mathematically as follows:

$$WAx = b \qquad \text{Eq (1)}$$

The least squares solution is formulated as follows:

$$\min_{x} \|WAx - b\|^2 \qquad \text{Eq (2)}$$

Where:
A is a diagonal (m×n)×(m×n) matrix whose diagonal elements are the pixel values of the upper slab image (e.g. SRL), where m is the number rows and n is the number of columns of the slab image.
W is a diagonal (m×n)×(m×n) matrix containing the weight values for each pixel of the upper slab image. In some instances, W can be an identity matrix (same weight for all upper slab pixels).
b is a column vector of (m×n) whose elements are the pixel values of the lower slab image (e.g. DRL).
x is a column vector of (m×n) whose elements are the pixel values of the unknown image which represents the lower slab image with reduced decorrelation tail artifacts.

The above discussed inverse-problem is a large scale problem with (m×n) number of unknowns. Solving this problem by the ordinary least squares technique may not lead to an acceptable result. Some smoothness in the forward direction, where A maps x to b, may be assumed. In solving this inverse-problem, the inverse-mapping operates as a high-pass filter that has the undesirable tendency of amplifying noise. Tikhonov regularization may solve this problem under the assumption that we desire a smooth solution, by giving preference to a particular solution with a smoothness property. A regularization term can be included in the minimization as follows:

$$\min_{x} \|WAx - b\|^2 + \alpha \|\Gamma x\|^2 \qquad \text{Eq (3)}$$

Where:
α is the regularization parameter.
Γ is a matrix of (m×n)×(m×n) which contains a repetition of a modified laplacian kernel.
Γx represents the convolution of unknown image with a Laplacian or Gaussian of Laplacian of a 2D function in a form of matrix-vector multiplication.

The above equation (Eq (3)) can be rewritten as follows:

$$\begin{bmatrix} WA \\ \alpha \Gamma \end{bmatrix} x = \begin{bmatrix} b \\ 0 \end{bmatrix} \qquad \text{Eq (4)}$$

$$Mx = B$$

Where matrix M is a sparse matrix.

Note that prior to solving the equation, a preprocessing on the upper and the lower slab images may need to be performed. For instance, the upper and lower slab image values can be scaled for normalization.

In some embodiments, the inverse problem discussed herein may alternatively be solved by Tikhonov regularization by giving preference to solutions with smaller norms. A regularization term can be included in the minimization as follows:

$$\min_{x} \|WAx - b\|^2 + \alpha \|Ix\|^2 \qquad \text{Eq (5)}$$

Where:
α is the regularization parameter.
I is an identity matrix of (m×n)×(m×n).

The explicit solution of this minimization problem is:

$$\hat{x} = (B^T B + \alpha I^T I)^{-1} B^T b$$

where B=WA

Since B and I are both diagonal matrices, this solution suggests that each pixel of the reconstructed image is calculated based on a point-wise operation as follows:

$$\hat{I}_l(x, y) = \frac{w(x, y) \cdot I_u(x, y) \cdot I_l(x, y)}{w^2(x, y) I_u^2(x, y) + \alpha}$$

where $w$, $I_u$, $I_l$, and $\hat{I}_l$ are weight, upper, lower, and reconstructed images for the x, y location respectively.

Figure 4B:
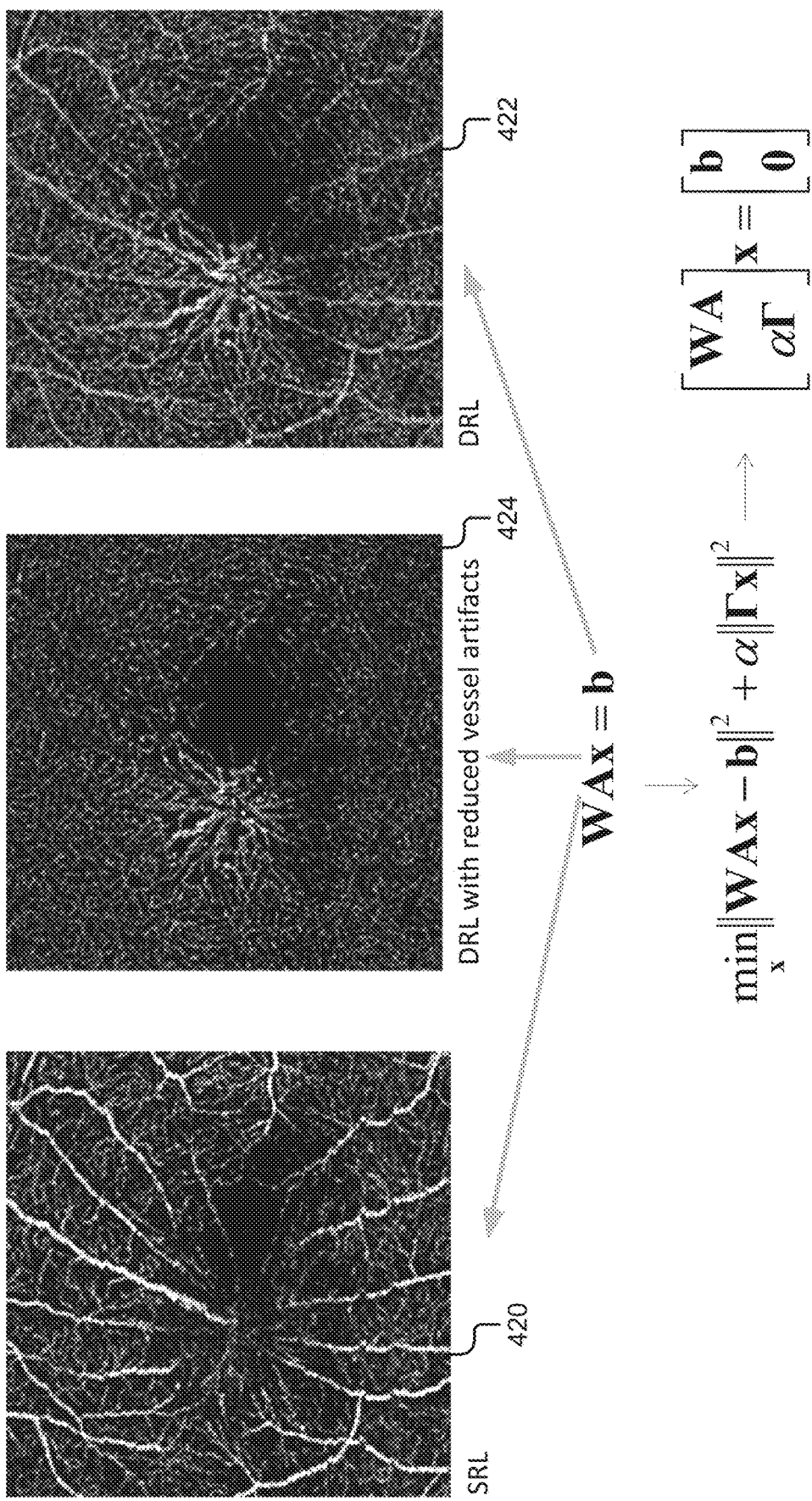
FIG. 4B illustrates an example of producing an artifact reduced image based on a multiplicative mixing model of artifact reduction of the present invention. 4C illustrates an example scenario of how the degree of artifact reduction can be controlled based on different values of the regularization parameter α.

FIG. 4B shows images of the deeper retinal layer with reduced decorrelation tail artifacts generated based on an inverse problem approach discussed above. In particular, FIG. 4B depicts a superficial retinal layer (SRL) image 420, a deeper retinal layer (DRL) image 422 with artifacts, and a DRL image 424 with reduced vessel artifacts, which is generated upon solving Eq (4), as discussed above.

Figure 4C:
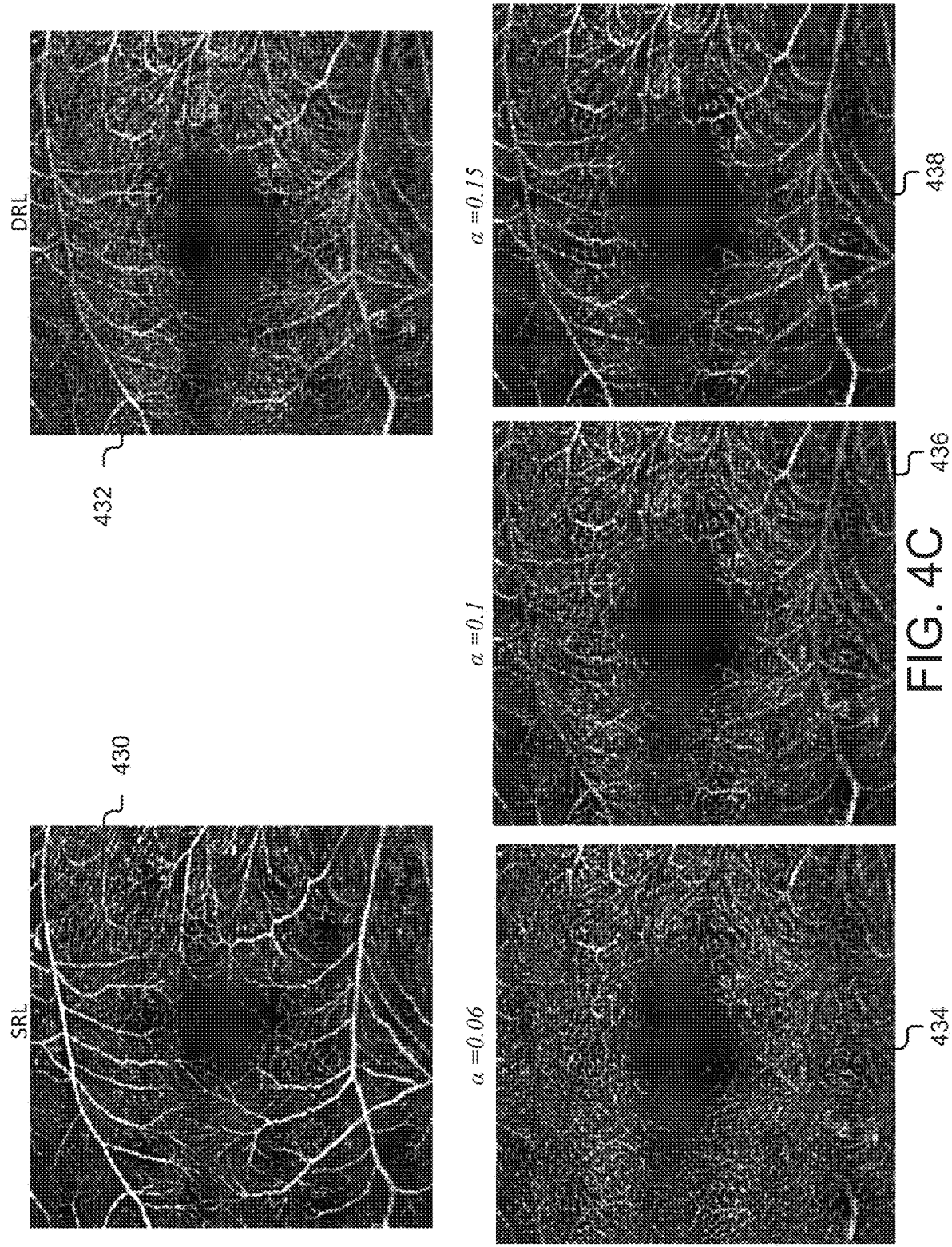
FIG. 4D illustrates an example artifact reduction scenario for the case of the outer retina. 4E shows decorrelation tail reduction for two different inner plexiform layer (IPL)-outer plexiform layer (OPL) slabs.
FIG. 4F shows a upper slab image, a lower slab image, and the artifact reduced lower slab image with a local patch centered at a certain image pixel.
FIG. 4G illustrates an example of decorrelation tail artifact reduction by an independent component analysis (ICA) approach.

The artifacts removal approach discussed above can be optimized for better performance based on regularization parameter α The value of α may depend on the chosen bottom layer, sampling, quality of images, and field of view. In some embodiments, a reasonable range of α is between 0 and 1. The value of α can be interpreted as a degree of artifact reduction. FIG. 4C illustrates an example scenario of how the degree of artifact reduction can be controlled based on different values of the regularization parameter α. As depicted, FIG. 4C shows a SRL image 430, a DRL image 432 having artifacts, and three deeper retinal layer (DRL) images 434, 436, and 438 with reduced decorrelation artifacts that are generated based on different values of a. In particular, reference numeral 434 depicts a DRL image with reduced decorrelation artifacts based on a value chosen as 0.06, reference numeral 436 depicts a DRL image with reduced decorrelation artifacts based on α value chosen as 0.1, and reference numeral 438 depicts a DRL image with reduced decorrelation artifacts based on α value chosen as 0.15. As depicted, the decorrelation artifacts in the first image 434 having α value=0.06 is less than the other two images 436 and 438.

Figure 4D:
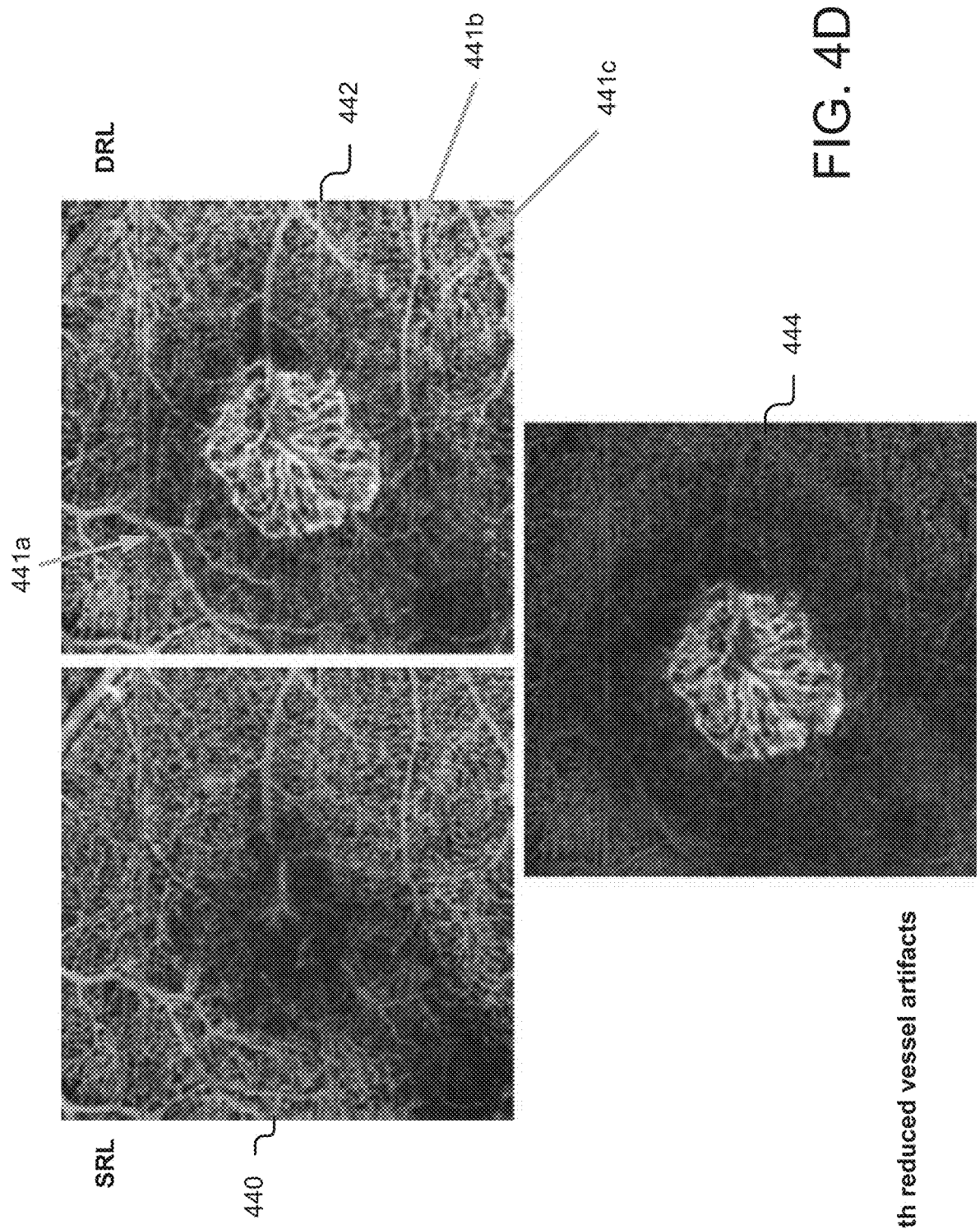

In some embodiments, the artifact removal approach discussed above can also be applied for reducing projection or decorrelation tail artifacts in the outer or deeper retina, which may include the choroidal neovascular membranes (CNVM). Here, the lower slab may contain the RPE layer which causes strong decorrelation tail artifacts. The upper slab can be generated based on all retinal layers (including SRL, DRL, and avasculature zone). FIG. 4D illustrates an example artifact reduction scenario for the case of the outer retina. In particular, FIG. 4D shows an example upper slab image 440, an example lower slab image 442 having artifacts, and an example lower slab image 444 with reduced artifacts generated based on the approach discussed herein. As depicted, the original lower slab image 442 before artifacts removal contained large vessel artifacts (see for example artifacts 441*a-c*). After the artifacts removal, the resulting image 444 shows the CNV with reduced artifacts.

Additive Mixing Artifacts Reduction Approach

Taking the case of additive mixing, the decorrelation tail artifacts reduction problem, similar to the multiplicative mixing approach discussed above, can be formulated as an inverse problem. The goal is to reconstruct an unknown image with reduced artifacts given an upper slab or upper layer(s) image and a lower slab or deeper layer(s) image, as shown and discussed, for example with respect to FIG. 4B. In the additive mixing case, the formulation can be written mathematically as follows:

$$WI_u + I_l = I_l$$

This equation indicates that a fraction (W) of upper slab signal ($I_u$) is added (pointwise) to the artifact reduced lower slab image ($\hat{I}_l$) resulted a lower slab image ($I_l$) as shown in FIG. 4B.

Upon converting this equation in a matrix-vector form, the least squares solution can be formulated as follows:

$$\min_y \|Ay - b\|^2$$

Where:
A is a sparse matrix whose non-zeros elements contain the pixel values of $I_u$ and ones,
b is a column stack of the pixel values of $I_l$, and
$y=[w\ x]^T$ with w and x are the row stack of unknown weights W and unknown image $\hat{I}_l$ or $y=[w\ x]^T$ with w is assumed to be the same for all pixel values of the upper slab $I_u$.

The above inverse-problem is a large scale problem with (2×m×n) number of unknowns if $y=[w\ x]^T$. The number of unknowns reduces to 1+m×n if $y=[w\ x]^T$. Tikhonov regularization may solve this problem by giving preference to solutions with smaller norms or assuming a smooth solution. A regularization term can be included in the minimization as follows:

$$\min_y \|Ay - b\|^2 + \alpha\|\Gamma y\|^2 \qquad \text{Eq (6)}$$

Where:
α is the regularization parameter, and
Γ is a matrix which contains a repetition of a filter kernel, or an identity matrix.

Assuming the same weight w for all upper slab image pixels, an alternate solution for removing the decorrelation tail using the additive mixing model is to solve for the weight w first rather than solving all unknowns with a single equation (Eq (6)). The basic idea is to minimize the similarity of the upper slab $I_u$ and the solution $\hat{I}_l = I_l - wI_u$. Basically, the upper slab and the unknown lower slab with no decorrelation tail artifacts should not have any similar vessel patterns.

Thus, the equation $\hat{I}_l = I_l - wI_u$ with a weight for the entire upper slab image can be written as:

$$\hat{I}_l = I_l - wI_u$$

For instance, normalized cross correlation coefficient can be considered as a similarity metric which leads to the following minimization problem:

$$\min_w \gamma^2(I_u, I_l - wI_u) \qquad \text{Eq (7)}$$

$$\gamma^2(I_u, I - wI_u) = \frac{\text{Cov}^2(I_u, I_l - wI_u)}{\text{Var}(I_u) \cdot \text{Var}(I_l - wI_u)}$$

The explicit solution for above minimization leads to:

$$w_{min} = \frac{\text{Cov}(I_u, I_l)}{\text{Var}(I_u)}$$

$\hat{I}_l$ is determined by plugging $w_{min}$ into $$\hat{I}_l = I_l - w_{min} I_u$$

Figure 4E:
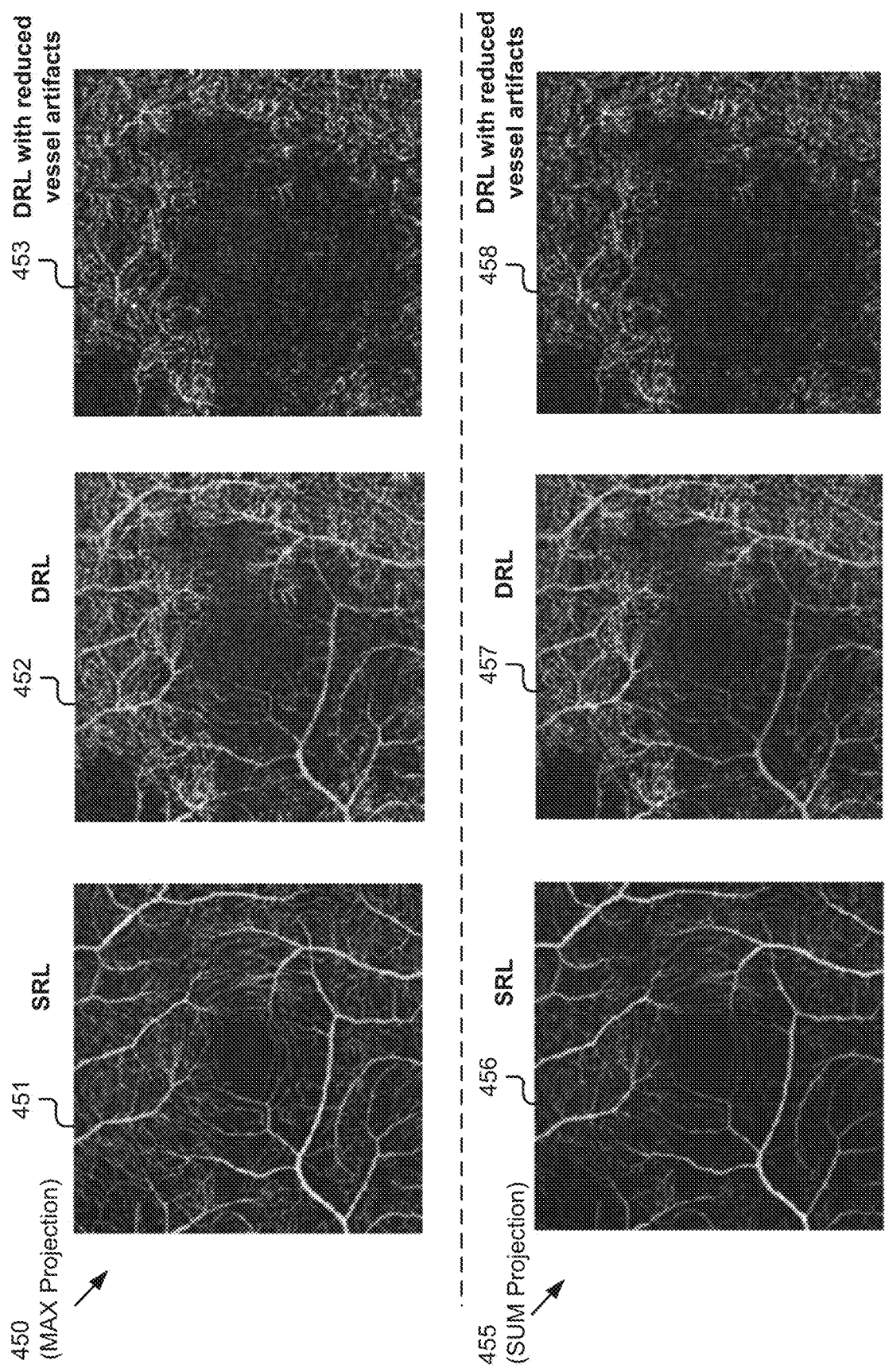

To illustrate the above additive mixing approach, FIG. 4E shows decorrelation tail reduction for two different IPL-OPL slabs. Here, the first row 450 represents max projection (i.e., slab images generated based on maximum value in the axial direction) and second row 455 represents sum projection (i.e., slab images generated based on summation of pixel values in the axial direction). In each of these rows 450 or 455, the left images (451,456) are the upper slabs, the middle images (452,457) are the lower slabs, and the right images (453,458) are the lower slabs after decorrelation tail reduction.

Figure 4F:
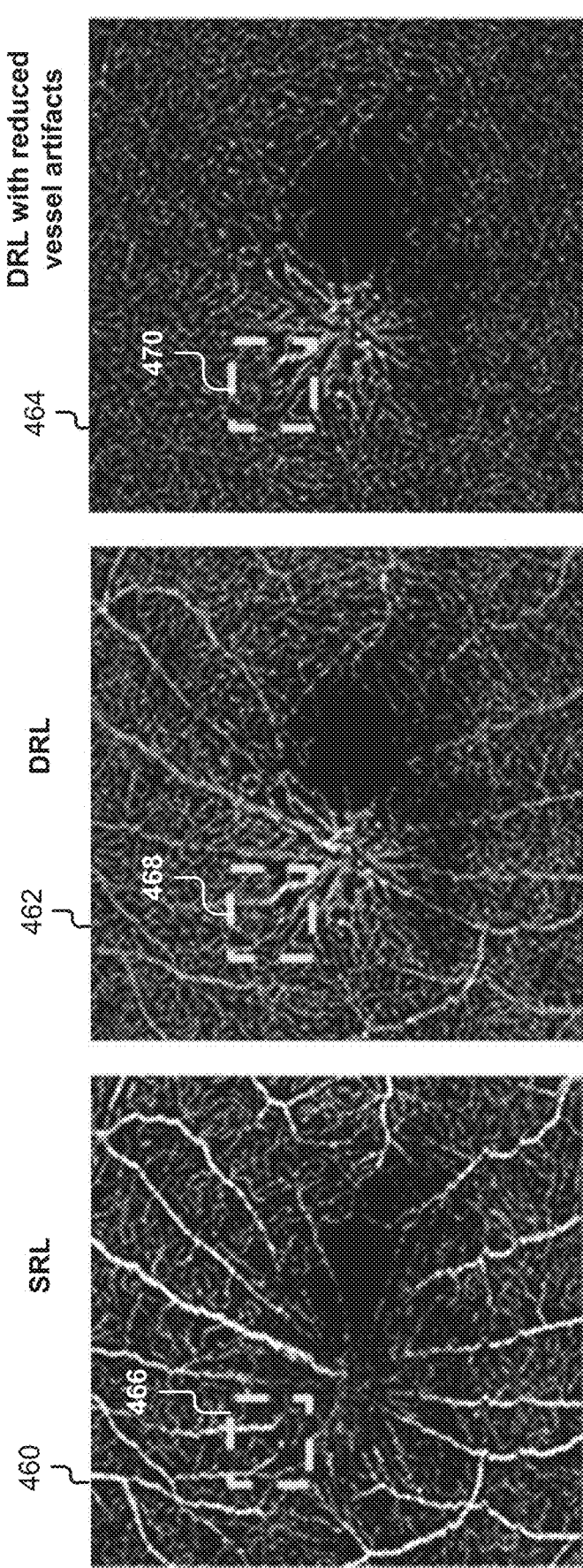

The above discussed solution can be localized for sub-regions of the images or patches centered at each pixel. FIG. 4F shows the upper slab image $I_u$ (indicated by reference numeral 460), the lower slab image $I_l$ (indicated by reference numeral 462), and the artifact reduced lower slab image $\hat{I}_l$ (indicated by reference numeral 464) with a local patch centered at the pixel i. The dashed boxes 466, 468, and 470 in these images indicate patch sub-images $I_{u,i}$, $I_{l,i}$, and $\hat{I}_{l,i}$. For instance, the weight for each pixel can be calculated based on the combination (e.g. weighted average) of weights for surrounding pixels.

Some of the advantages of the above discussed additive mixing approach for artifact reduction include, for example, no adjustable parameters needed, adaptive and localized approach, and no assumption required for signal attenuation in depth.

Other similarity metrics to calculate w for each patch could be:
- Mean Squares: sum of squared differences between intensity values
- Pattern Intensity: squared differences between transformed intensity values
- Mutual Information: mutual information is based on joint entropy Yet another solution in the additive mixing model for decorrelation tail artifacts reduction is by independent component analysis (ICA). Assuming that upper and lower signals are statistically independent, ICA can be used to remove the decorrelation tail from the lower slab image (see for example, *Independent component analysis: algorithms and applications*, A. Hyvärinen, E. Oja, *Neural Networks* Volume 13, Issues 4-5, June 2000, Pages 411-430, hereby incorporated by reference). Basically, the use of ICA is by minimizing mutual information of upper and lower slab images. The problem of decorrelation tail removal given a upper slab image and a lower slab image can be formulated as $$\begin{bmatrix} Y_u \\ Y_l \end{bmatrix} = A \begin{bmatrix} X_u \\ X_l \end{bmatrix}$$

Where $X_u$ and $X_l$ are the row stack of the upper slab image $\hat{I}_u$ and the lower slab image $\hat{I}_l$ (two unknown images to estimate) that are mixed linearly to produce two images $Y_u$ and $Y_l$, which are the row stack of the upper slab image $I_u$ and the lower slab image $I_l$ respectively. Here, A is a (2×2) matrix which represents the linear mixing. ICA algorithm recovers vectors $X_u$ and $X_l$.

Figure 4G:
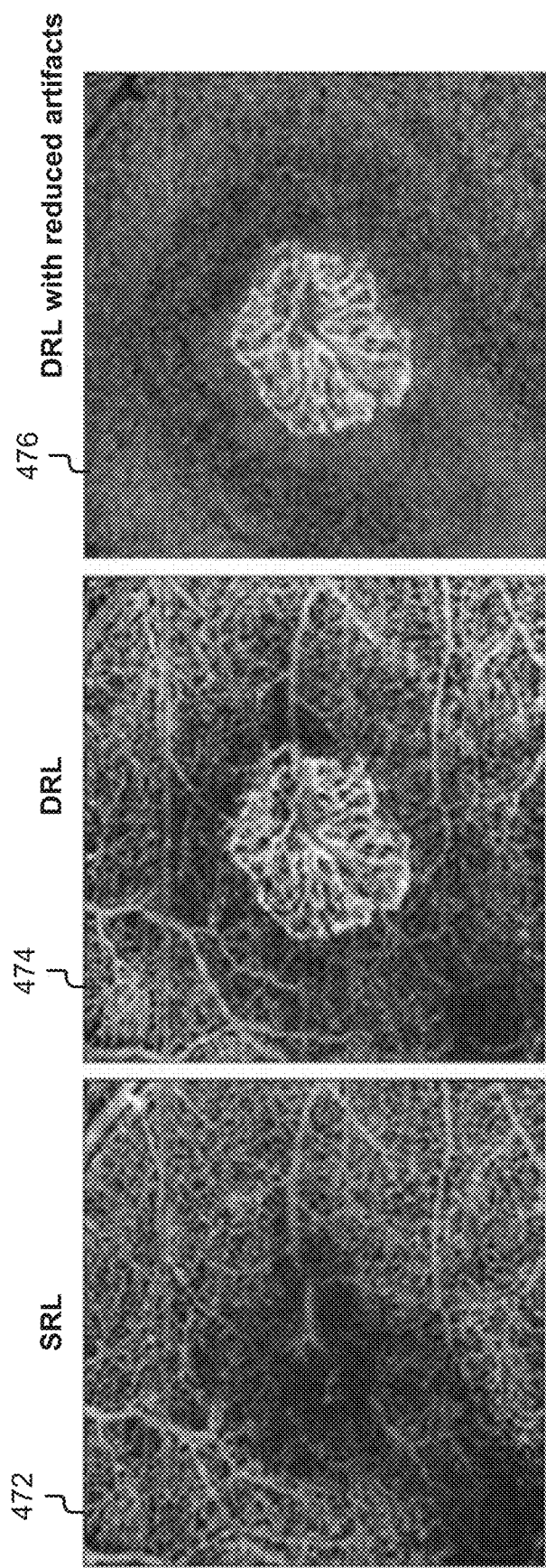

An example of decorrelation tail artifacts reduction by ICA is illustrated in FIG. 4G. This figure shows the upper slab image 472 and the lower slab image 474 containing the decorrelation tail artifacts. The third image 476 represents the recovered source image (i.e., the lower slab without decorrelation tail).

Decorrelation Tail Artifacts Reduction in Flow OCT Volume

Figure 5B:
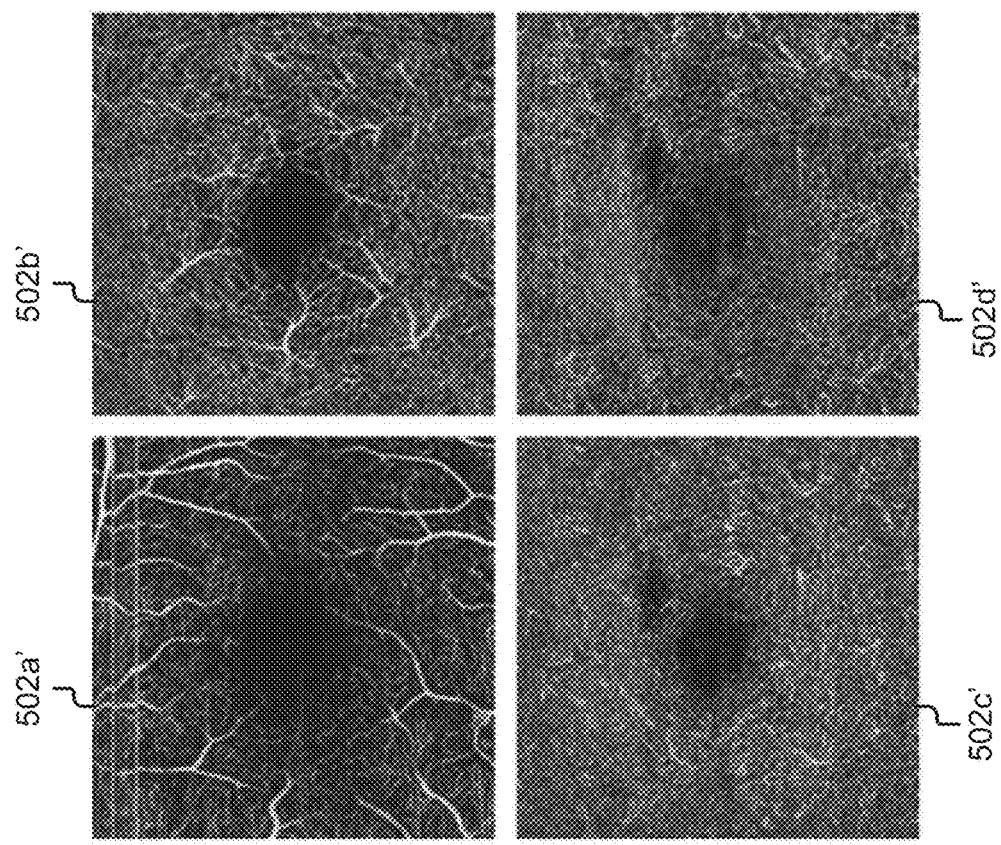
FIG. 5B shows the decorrelation tail removed from these slab images.
Figure 5A:
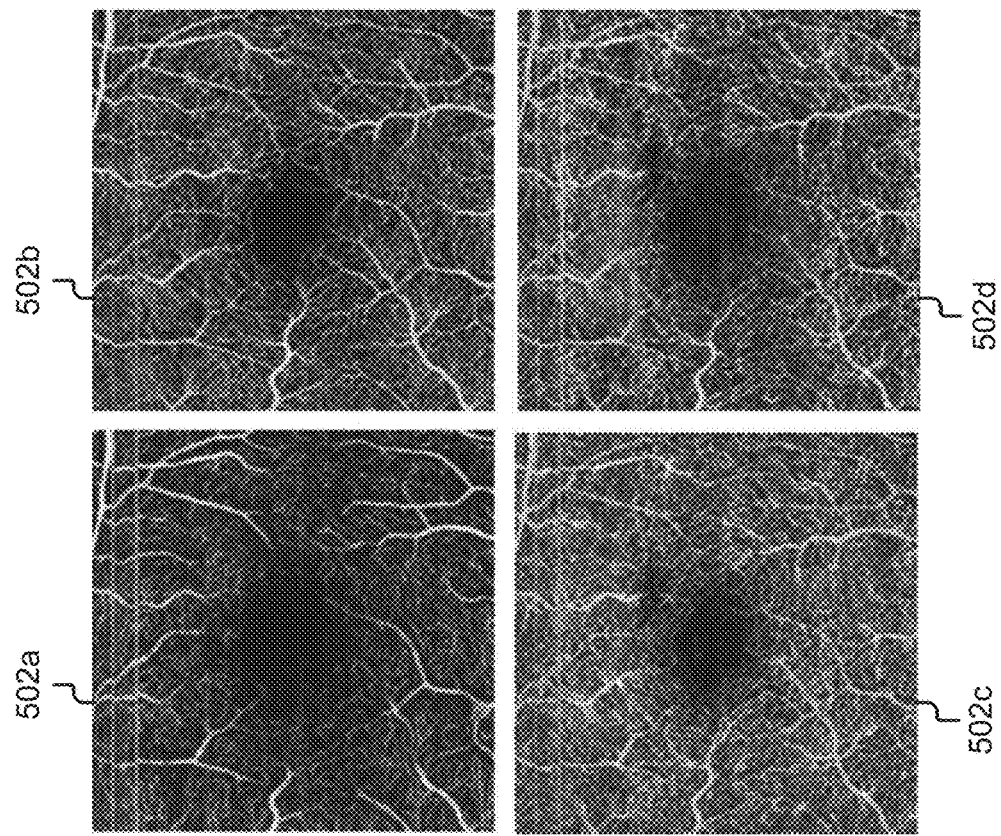
FIG. 5A shows four example slab images generated as result of dividing the inner retina in four thin layers.

Projection artifacts can also be removed from an entire OCT flow volume or a sub-volume using above discussed 2-D artifacts reduction approaches. First, the OCT volume below the inner limiting membrane (ILM) is divided into thin layers. As an alternative to the ILM as a starting point, other layer boundaries or combination of layer boundaries could be used to generate the thin layers to start this process from inner or outer retina. Second, projection artifacts are removed (based on any of the above discussed artifacts reduction approaches) from each slab that is generated from a corresponding thin layer. The first and second steps are illustrated in FIGS. 5A and 5B. In particular, FIG. 5A shows four slab images 502a-d generated as a result of diving the inner retina in four thin layers. FIG. 5B shows the artifact reduced slab images 502a'-502d' resulting from decorrelation tail removal. Note that the original first slab image or first thin layer 502a has no decorrelation tail since it is the topmost layer the OCT beam passes through. Next, a point-wise ratio is computed for each slab as follows. Given the lower slab image $I_l$ associated to a thin layer and corresponding artifact reduced reconstructed image $\hat{I}_{l'}$, the point-wise ratio of these images can be calculated as follows:

$$R = \hat{I}_{l'}/I_l$$

Figure 5C:
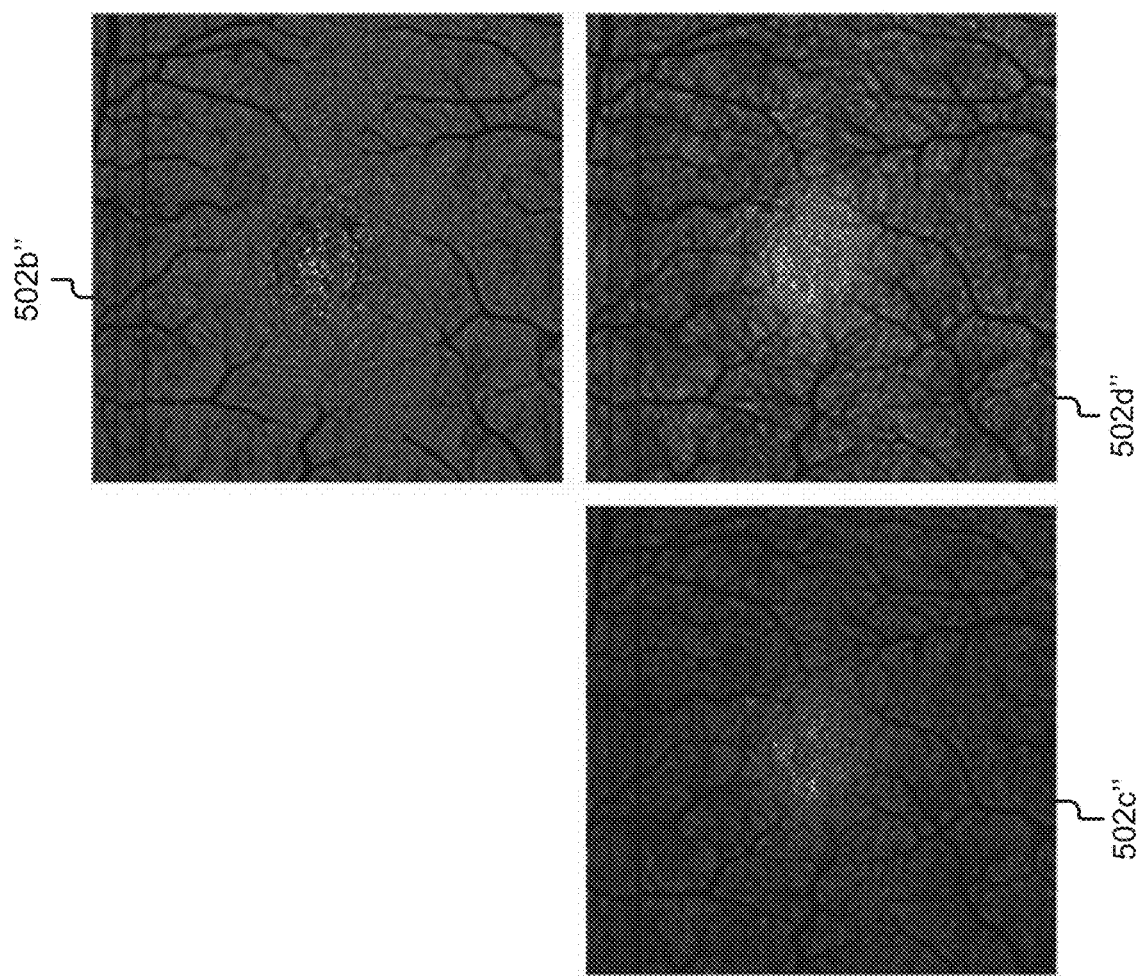
FIG. 5C shows images each resulting from computing a point-wise ratio of a slab image and the corresponding artifact reduced slab image as shown in FIGS. 5A and 5B, respectively.
Figure 6B:
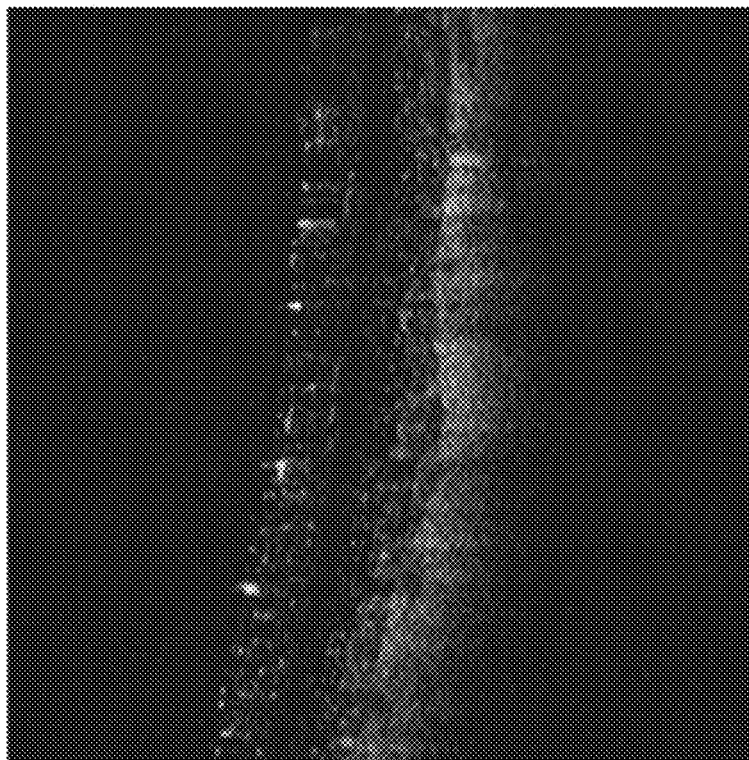
FIG. 6B shows the same flow B-scan with reduced projection artifacts by applying the inverse problem artifact reduction approach over the entire OCT volume.
Figure 6A:
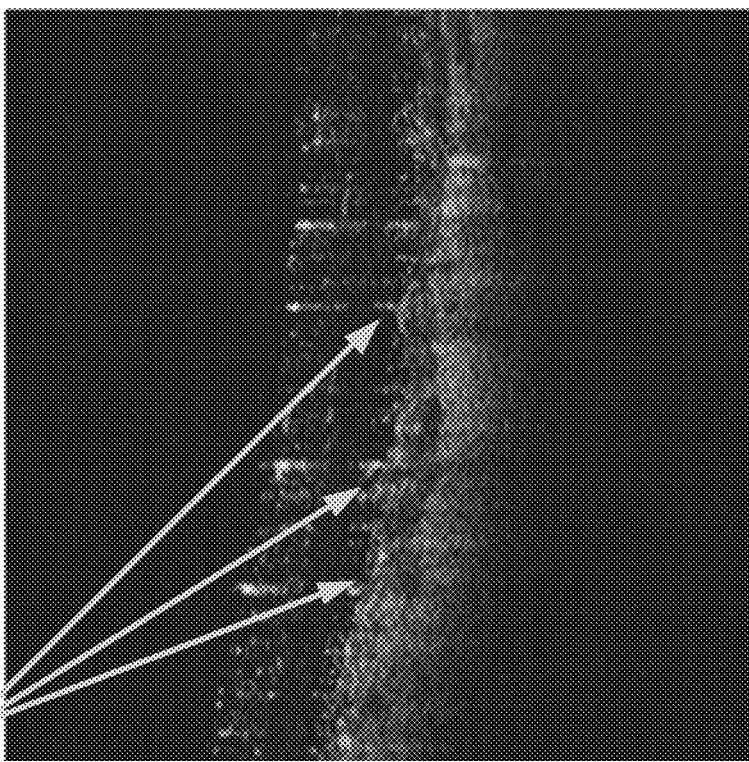
FIG. 6A shows a flow B-scan with projection artifacts.

The point-wise ratio gives a correction factor for each A-scan bounded by two thin layer boundaries. The A-scan at lateral position x, y, is multiplied by R(x,y) to resolve the decorrelation artifact within the thin layer. FIG. 5C shows example images 502b"-502d" upon computing point-wise ratio 502b'/502b, 502c'/502c, and 502d'/502d, respectively. The computed point-wise ratios can be applied to the thin layers to remove the artifacts from the OCT flow volume as discussed above (i.e., the A-scan bounded by two thin layer boundaries at lateral position x, y, is multiplied by R(x,y) to resolve the decorrelation artifact within the thin layer). An example of this is illustrated in FIGS. 6A and 6B. Specifically, FIG. 6A shows a flow B-scan with projection artifacts (e.g., artifacts 602) whereas FIG. 6B shows the same flow B-scan with reduced projection artifacts.

For thicker layers, one could use the values of R to design a decay function to attenuate the decorrelation artifact signal in each A-scan bounded by two layer boundaries. Possible decay functions could be, for example and without limitation, constant, linear, polynomial $2^{nd}$ order, exponential, logarithmic, flexible sigmoid, etc.

An alternative solution is to apply the weight $w_{min}$, calculated in the second additive approach, directly to the thin layer subject to decorrelation tail removal.

Data Correction Technique for Depth Dependent Artifacts Reduction

In other embodiments of the present application, a data correction technique, such as a depth-dependent volumetric processing can be applied to OCT image data (e.g., frames, volumes, B-scans, etc.) before an OCT angiography processing (e.g., intensity-based, phase-based, complex-based, etc.) is performed on the data for calculating motion contrast information. Data correction before OCT angiography processing is advantageous as it may reduce some artifacts, such as motion and decorrelation tail effects, before one or more artifacts reduction approaches, including the artifacts removal approach discussed herein are carried out based on the motion contrast information. Another advantage of data correction before OCT angiography processing is an improvement in overall image quality which may require fewer OCT acquisitions for creating high quality angiography images. For instance, using the depth dependent data correction technique described herein, OCT angiography images can be generated with only two OCT acquisitions at the same transverse location on the sample instead of the four or more that were previously demonstrated.

Figure 7:
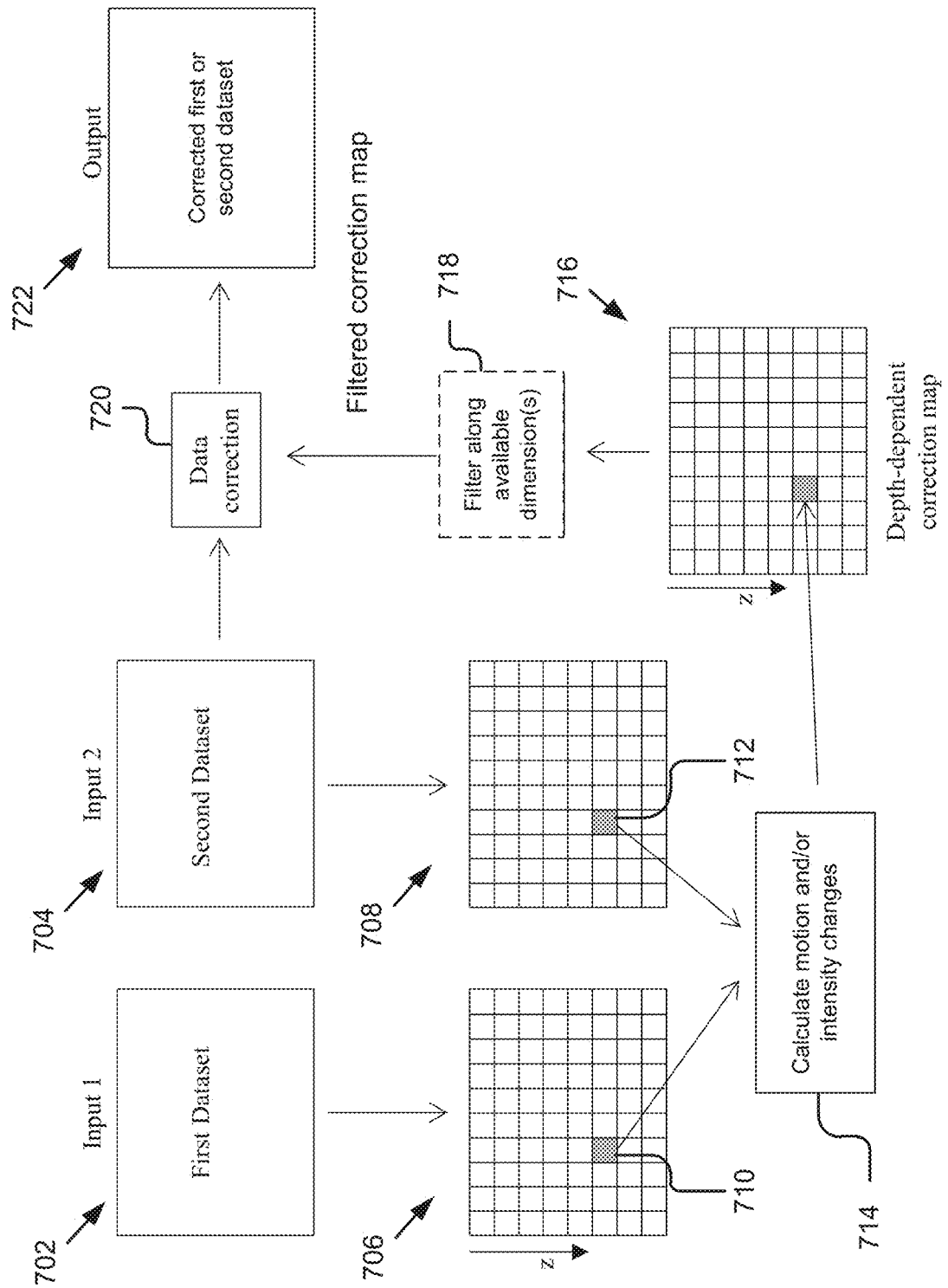
FIG. 7 is a generalized flow diagram of an example data correction technique for motion and/or scattering correction.

One approach of doing a depth dependent data correction is to take a ratio of two datasets (e.g., frames, volumes, A-scans, etc.) collected from the same sample location at time t=n and t=n+1, filter along the z-axis or other available dimension, and apply a depth-dependent normalization to one of the datasets to obtain the corrected dataset, which may then be used by an OCT angiography processing technique to obtain motion contrast data containing vasculature flow information. FIG. 7 depicts a general flow diagram of this approach where two sets of data (e.g., frames, volumes, A-scans, etc.), as indicated by reference numerals 702 and 704 are used. These datasets may consist of complex data (containing both amplitude and phase information) or in some instances, only one of the amplitude or the phase information. The datasets 702 and 704 are then split into multiple regions of interests 706 and 708, respectively, the regions of interest being selected to correspond to approximately the same regions of the sample in the two datasets. In some instances, two or more regions in either of the datasets may overlap with one another. Furthermore, the regions of interest may not cover the entire sets of data which might be advantageous to, for instance, decrease the computational requirements for the technique discussed herein. For each pair of regions in the two datasets, for example the pair of regions (710, 712), motion and/or intensity changes between them are calculated, as indicated by reference numeral 714 to generate a depth-dependent correction map 716. Each pair of regions (710,712) will generate one or more pieces of information which are stored at a corresponding location in the correction map 716. For each pair of regions (710,712), the correction map 716 may describe or indicate information such as, but not limited to, the amount of measured motion along x, y, and z dimensions, and the change in intensity. In some embodiments, motion measurements can be made on a sub-pixel level, as discussed in further detail below.

Optionally, the resulting correction map 716 may be filtered 718 along one or more dimensions (x, y, and/or z) to smooth out any noise, interpolate missing data, etc. One or more filters applied in filtering step 718 may include linear and/or non-linear filters, such as bilateral edge-preserving filters, curve flitting filters, etc. In some embodiments, the filtering step 718 may be performed jointly for corrections of both the motion and the intensity changes. In other embodiments, the filtering step 718 may be performed independently to the intensity and motion corrections. Using the optionally filtered correction map obtained after step 718, a non-uniform correction along a particular dimension such as z, as indicated by reference numeral 720, can be applied to one of the inputs (i.e., the dataset 702 or the dataset 704) to correct for any non-uniform changes along the particular dimension relative to the other dataset. As depicted, the output after the data correction applied to either the first dataset 702 or the second dataset 704 is the corrected dataset 722.

Sub-Pixel Motion Measurement

For the most accurate image registration, motion can be measured on a sub-pixel level (see for example US Publication No. 2016/0040977, the contents of which are hereby incorporated by reference). To correct for local distortions in the tissue, sub-pixel motion correction can be applied locally along the depth and/or the lateral dimensions. This can be performed in multiple ways but one way is by analyzing the cross-correlations between regions of the two datasets as a function of spatial shift (e.g., axial or lateral). In some embodiments, measuring cross-correlations on small amounts of data can lead to large errors. This may be due to random correlations between two small datasets. To minimize or eliminate these random correlations, in some instances, a multi-step alignment procedure may be performed prior to sub-pixel motion correction. In this procedure, a large amount of data (possibly all) may be used to roughly align the two datasets. Once the two datasets are aligned, sub-pixel motion measurements can be performed between corresponding regions of the two datasets and then filtering, curve fitting, or other processing techniques can be performed across sub-pixel motion measurements to remove any noise or inconsistencies in the shift measurements. By way of an example, sub-pixel shifts between corresponding A-scans of two sequentially acquired B-scans may be measured and then a low degree polynomial fit may be applied across these sub-pixel shifts to estimate the slow-varying motion across the B-scans.

Example Methods for Depth Dependent Artifacts Reduction

Figure 8:
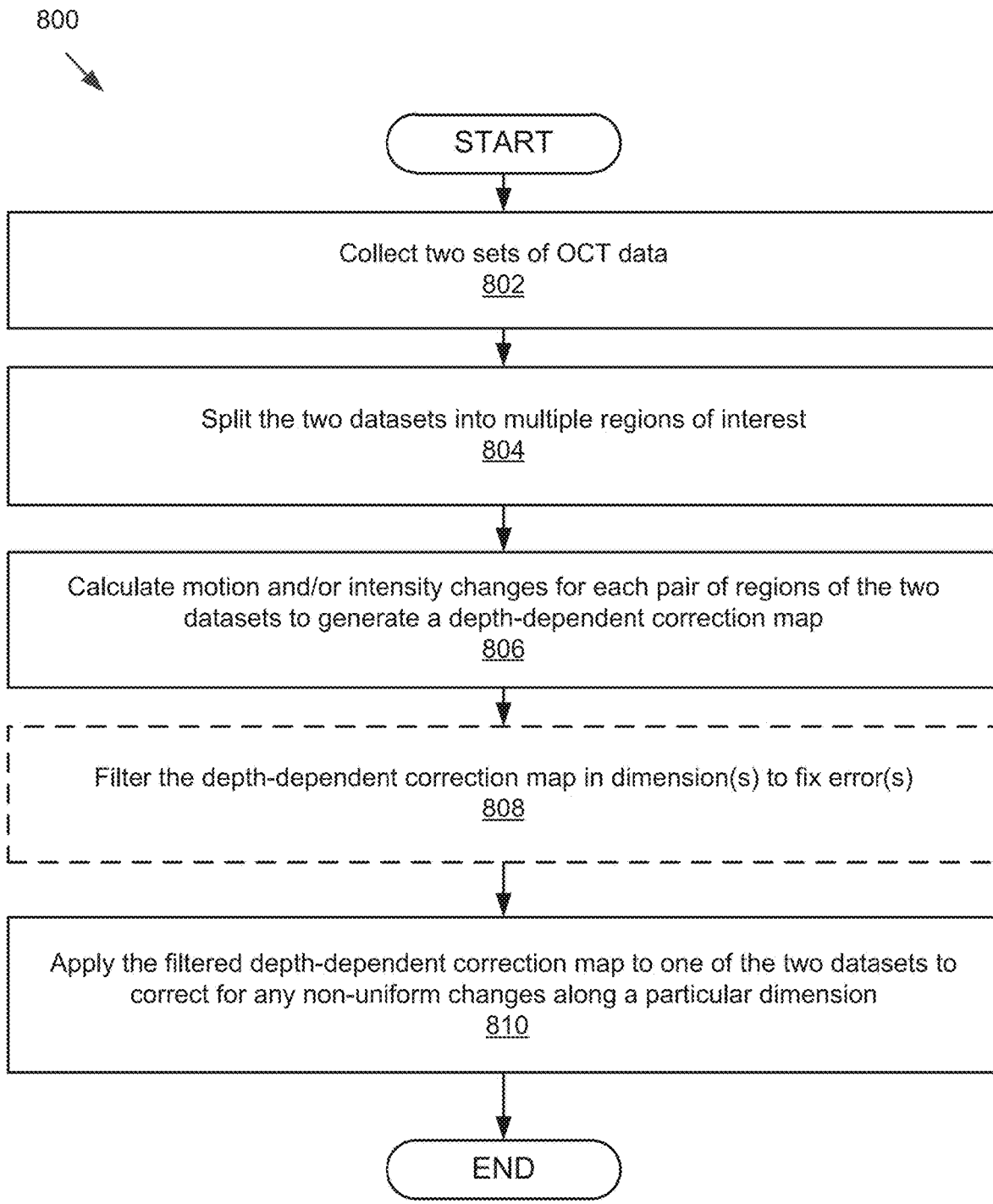
FIG. 8 is a flowchart of an example method for correcting an OCT image data based on a data correction technique.
Figure 9:
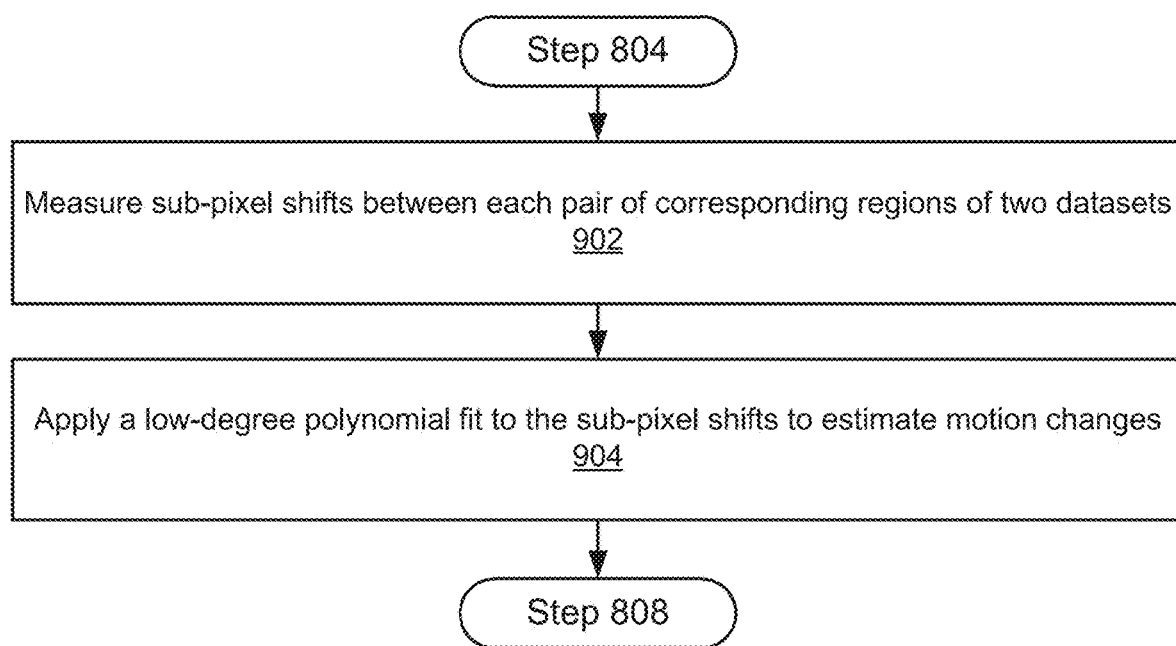
FIG. 9 is a flowchart of an example method for estimating motion changes based on a sub-pixel level.

The depth dependent data correction technique discussed herein is now described with respect to some exemplary methods, which are depicted in FIG. 8 and FIG. 9. It should be understood that the methods described herein are not limited to the steps and/or operations embodied by them and that other steps and/or operations are also possible and are within the scope of the present disclosure.

FIG. 8 is a flowchart of an example method 800 for correcting an OCT image data based on α depth dependent data correction technique. The method 800 begins by collecting 802 two sets of OCT image data using an OCT system. The OCT image data may include three-dimensional data, two-dimensional data and/or in some instances, one-dimensional data. For example, the OCT image data may include frames, volumes, B-scans, and/or even only A-scans. Each of the datasets may include data collected from the same location but at different time intervals. In some embodiments, the datasets may be partially overlapping such as two frames separated by a fraction of a point-spread function along the slow-scan axis (y-dimension) (see for example US Publication No. 2012/0307014). In block 804, each of the two datasets may be split into multiple regions of interest, as shown for example in FIG. 7 by reference numerals 706 and 708. The multiple regions of interests of each dataset must cover approximately the same sample locations. In some embodiments, these regions of interest may be spatially overlapping. Next in block 806, one or more of motion and intensity changes may be calculated for each pair of regions from the two datasets to generate a depth-dependent correction map. In some embodiments, calculating the motion changes 806 can be done on a sub-pixel level, as shown in FIG. 9. For instance, referring now to FIG. 9, motion change estimation based on sub-pixel level may include measuring 902 sub-pixel shifts between each pair of corresponding regions of the two datasets and then applying 904 a low-degree polynomial fit to the sub-pixel shifts measurements to estimate the motion changes across multiple regions of the correction map.

Referring back to FIG. 8, in block 808, the resulting depth-dependent correction map that was generated in block 806 can be optionally filtered in one or more dimensions (e.g., along z and/or x) to fix one or more errors, such as to smooth out any noise, interpolate missing data, etc. As depicted in the figure, the block 808 is shown with dotted lines to indicate that it is an optional step and may not be performed at all times for the depth-dependent data correction discussed herein. In block 810, the depth-dependent correction map, which may be filtered, can be applied to one of the two datasets to correct for any non-uniform changes along a particular dimension, such as the z dimension. The corrected dataset along with the other dataset may then be used by an OCT angiography processing technique (e.g., amplitude-based, phase-based, complex-based, etc.) to generate motion contrast information. If desired, 2D angiographic slab images including an upper slab image and a lower slab image can then be produced from the resulting motion contrast information for use by the artifacts removal approach discussed herein for artifacts reduction. Because of the data correction performed prior to OCT angiography processing, the lower slab image may already be artifact free or may include substantially less artifacts than it may would have include without the data correction.

Figure 10:
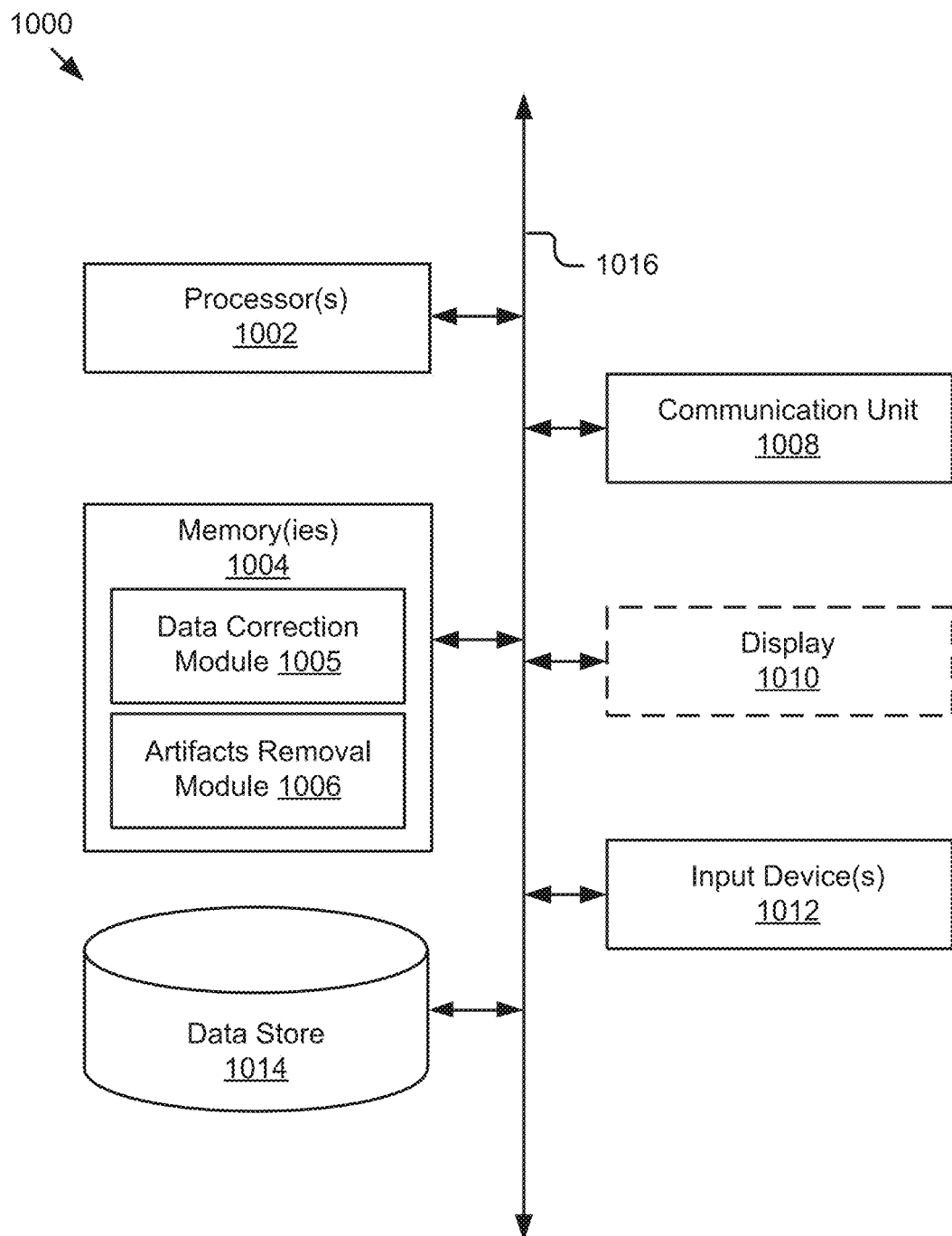
FIG. 10 is a block diagram of a general computer system that may perform the functions discussed in this disclosure according to one aspect of the present invention.

In some embodiments, some or all operations and/or steps discussed above with respect to FIG. 8 and FIG. 9 can be performed by the data correction module 1005 (see FIG. 10).

In some instances, the data correction module 1005 and the artifacts reduction module 1006 may be coupled to each other, via the processor(s) 1002, for sending and/or receiving data, and the data correction module 1005 may send one or more of its results or outputs to the artifacts removal module 1006 for it to perform its functionalities discussed herein.

Example Computer System

The processing unit 121 that has been discussed herein in reference to FIG. 1 can be implemented with a computer system configured to perform the functions that have been described herein for this unit. For instance, the processing unit 121 can be implemented with the computer system 1000, as shown in FIG. 10. The computer system 1000 may include one or more processors 1002, one or more memories 1004, a communication unit 1008, an optional display 1010, one or more input devices 1012, and a data store 1014. The display 1010 is shown with dotted lines to indicate it is an optional component, which, in some instances, may not be a part of the computer system 1000. In some embodiments, the display 1010 discussed herein is the display 122 that has been discussed herein in reference to FIG. 1.

The components 1002, 1004, 1008, 1010, 1012, and 1014 are communicatively coupled via a communication or system bus 1016. The bus 1016 can include a conventional communication bus for transferring data between components of a computing device or between computing devices. It should be understood that the computing system 1000 described herein is not limited to these components and may include various operating systems, sensors, video processing components, input/output ports, user interface devices (e.g., keyboards, pointing devices, displays, microphones, sound reproduction systems, and/or touch screens), additional processors, and other physical configurations.

The processor(s) 1002 may execute various hardware and/or software logic, such as software instructions, by performing various input/output, logical, and/or mathematical operations. The processor(s) 1002 may have various computing architectures to process data signals including, for example, a complex instruction set computer (CISC) architecture, a reduced instruction set computer (RISC) architecture, and/or architecture implementing a combination of instruction sets. The processor(s) 1002 may be physical and/or virtual, and may include a single core or plurality of processing units and/or cores. In some embodiments, the processor(s) 1002 may be capable of generating and providing electronic display signals to a display device, such as the display 1010, supporting the display of images, capturing and transmitting images, performing complex tasks including various types of feature extraction and sampling, etc. In some embodiments, the processor(s) 1002 may be coupled to the memory(ies) 1004 via a data/communication bus to access data and instructions therefrom and store data therein. The bus 1016 may couple the processor(s) 1002 to the other components of the computer system 1000, for example, the memory(ies) 1004, the communication unit 1008, or the data store 1014.

The memory(ies) 1004 may store instructions and/or data that may be executed by the processor(s) 1002. In the depicted embodiment, the memory(ies) 1004 stores at least a data correction module 1005 and an artifacts removal module 1006, each of which may include software, code, logic, or routines for performing any and/or all of the techniques described herein. For instance, the data correction module 1005 may perform all or some of the operations depicted in FIG. 8 and FIG. 9, and the artifacts removal module 1006 may perform all or some of the operations depicted in FIG. 2 and FIG. 3. In some embodiments, the memory(ies) 1004 may also be capable of storing other instructions and data including, for example, an operating system, hardware drivers, other software applications, databases, etc. The memory(ies) 1004 are coupled to the bus 1016 for communication with the processor(s) 1002 and other components of the computer system 1000. The memory(ies) 1004 may include a non-transitory computer-usable (e.g., readable, writeable, etc.) medium, which can be any apparatus or device that can contain, store, communicate, propagate or transport instructions, data, computer programs, software, code, routines, etc. for processing by or in connection with the processor(s) 1002. A non-transitory computer-usable storage medium may include any and/or all computer-usable storage media. In some embodiments, the memory(ies) 1004 may include volatile memory, non-volatile memory, or both. For example, the memory(ies) 1004 may include a dynamic random access memory (DRAM) device, a static random access memory (SRAM) device, flash memory, a hard disk drive, a floppy disk drive, a CD ROM device, a DVD ROM device, a DVD RAM device, a DVD RW device, a flash memory device, or any other mass storage device known for storing instructions on a more permanent basis.

The computer system for the processing unit 121 may include one or more computers or processing units at the same or different locations. When at different locations, the computers may be configured to communicate with one another through a wired and/or wireless network communication system, such as the communication unit 1008. The communication unit 1008 may include network interface devices (I/F) for wired and wireless connectivity. For example, the communication unit 1008 may include a CAT-type interface, USB interface, or SD interface, transceivers for sending and receiving signals using Wi-Fi™; Bluetooth®, or cellular communications for wireless communication, etc. The communication unit 1008 can link the processor(s) 1002 to a computer network that may in turn be coupled to other processing systems.

The display 1010 represents any device equipped to display electronic images and data as described herein. The display 1010 may be any of a conventional display device, monitor or screen, such as an organic light-emitting diode (OLED) display, a liquid crystal display (LCD). In some embodiments, the display 1010 is a touch-screen display capable of receiving input from one or more fingers of a user. For example, the device 1010 may be a capacitive touch-screen display capable of detecting and interpreting multiple points of contact with the display surface.

The input device(s) 1012 are any devices for inputting data on the computer system 1000. In some embodiments, an input device is a touch-screen display capable of receiving input from one or more fingers of the user. The functionality of the input device(s) 1012 and the display 1010 may be integrated, and a user of the computer system 1000 may interact with the system by contacting a surface of the display 1010 using one or more fingers. In other embodiments, an input device is a separate peripheral device or combination of devices. For example, the input device(s) 1012 may include a keyboard (e.g., a QWERTY keyboard) and a pointing device (e.g., a mouse or touchpad). The input device(s) 1012 may also include a microphone, a web camera, or other similar audio or video capture devices.

The data store 1014 can be an information source capable of storing and providing access to data. In the depicted embodiment, the data store 1014 is coupled for communication with the components 1002, 1004, 1008, 1010, and 1012 of the computer system 1000 via the bus 1016, and coupled, via the processor(s) 1002, for communication with the data correction module 1005 and the artifacts removal module 1006. In some embodiments, the data correction module 1005 and the artifacts removal module 1006 are configured to manipulate, i.e., store, query, update, and/or delete, data stored in the data store 1014 using programmatic operations.

In the above description, for purposes of explanation, numerous specific details are set forth in order to provide a thorough understanding of the specification. It should be apparent, however, that the subject matter of the present application can be practiced without these specific details. It should be understood that the reference in the specification to "one embodiment", "some embodiments", or "an embodiment" means that a particular feature, structure, or characteristic described in connection with the embodiment is included in one or more embodiments of the description. The appearances of the phrase "in one embodiment" or "in some embodiments" in various places in the specification are not necessarily all referring to the same embodiment(s).

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The foregoing description of the embodiments of the present subject matter has been presented for the purposes of illustration and description. It is not intended to be exhaustive or to limit the present embodiment of subject matter to the precise form disclosed. Many modifications and variations are possible in light of the above teaching. It is intended that the scope of the present embodiment of subject matter be limited not by this detailed description, but rather by the claims of this application. As will be understood by those familiar with the art, the present subject matter may be embodied in other specific forms without departing from the spirit or essential characteristics thereof.

The invention claimed is:

1. A method to reduce artifacts in optical coherence tomography (OCT) images of the eye, said method comprising:
   collecting OCT image data of the eye from an OCT system;
   creating a first image and a second image based on the collected OCT image data, the first image depicting one or more upper portions and the second image depicting one or more deeper portions, wherein the second image contains artifacts;
   using an inverse calculation, determining a third image that can be mixed with the first image to generate the second image, said third image depicting the one or more deeper portions as the second image but having reduced artifacts as compared to the second image;
   storing or displaying the third image or a further analysis thereof;
   wherein the inverse calculation is based on the following minimization:

$$\min_{w} \gamma^2(I_u, I_l - wI_u)$$

where $I_u$ is a vector representation of the first image, $I_l$ is a vector representation of the second image, w is a weight applied to the pixels of the first image, and $\gamma$ is a normalized cross correlation coefficient.

2. The method of claim 1, wherein the minimization has the following solution:

$$w_{min} = \frac{\text{Cov}(I_u, I_l)}{\text{Var}(I_u)}$$

and the third image is defined as the difference of the second image and the weighted first image $(I_l - w_{min} I_u)$.

3. The method of claim 1, further including:
   calculating motion contrast information in the collected OCT image data using an OCT angiography (OCTA) processing technique; and
   one or both of the first and second images is created from the motion contrast information.

4. The method of claim 3 further comprising applying a depth dependent data correction technique to the OCT image data for reducing motion and decorrelation tail artifacts in the data prior to calculating the motion contrast information.

5. The method of claim 1, wherein the first and second images are en face images, A-scan images, B-scan images, or volume images.

6. The method of claim 1 further comprising:
   using a point-wise ratio of the third image to the second image to remove artifacts from the collected OCT image data or a sub-set thereof.

7. The method of claim 1, wherein the first image and the second image contain one or more overlapping portions.

8. A method to reduce artifacts in optical coherence tomography (OCT) images of the eye, said method comprising:
   collecting OCT image data of the eye from an OCT system;
   creating a first image and a second image based on the collected OCT image data, the first image depicting one or more upper portions and the second image depicting one or more deeper portions, wherein the second image contains artifacts;
   using an inverse calculation, determining a third image that can be mixed with the first image to generate the second image, said third image depicting the one or more deeper portions as the second image but having reduced artifacts; and
   storing or displaying the third image or a further analysis thereof;
   wherein the inverse calculation includes:

$$\min_{x} \|WAx - b\|^2$$

where,
   A is the first image represented as a diagonal matrix,
   b is the second image represented as a column-stack image,
   x is the third image represented as a column-stack image, and
   W is a diagonal matrix containing weight values for each pixel of the first image.

9. The method of claim 8, wherein the inverse calculation includes:

$$\min_x \|WAx - b\|^2 + \alpha\|\Gamma x\|^2$$

where $\alpha\|\Gamma x\|^2$ is a regularization term with operator $\Gamma$ and $\alpha \in [0,1]$, which controls the degree of artifacts removal or reduction in the third image.

10. The method of claim 8, wherein the one or more upper portions and the one or more deeper portions contains different retinal layers.

11. The method of claim 8, wherein prior to determining the third image, the first image and the second image are normalized.

12. The method of claim 8, further including:
calculating motion contrast information in the collected OCT image data using an OCT angiography (OCTA) processing technique; and
one or both of the first and second images is created from the motion contrast information.

13. The method of claim 8, further comprising applying a depth dependent data correction technique to the OCT image data for reducing motion and decorrelation tail artifacts in the data prior to calculating the motion contrast information.

14. The method of claim 8, further comprising:
using a point-wise ratio of the third image to the second image to remove artifacts from the collected OCT image data or a sub-volume thereof.

15. The method of claim 8, wherein the first image and the second image contain one or more overlapping portions.

16. A method to reduce artifacts in optical coherence tomography (OCT) images of the eye, said method comprising:
collecting OCT image data of the eye from an OCT system;
creating a first image and a second image based on the collected OCT image data, the first image depicting one or more upper portions and the second image depicting one or more deeper portions, wherein the second image contains artifacts;
using an inverse calculation, determining a third image that can be mixed with the first image to generate the second image, said third image depicting the one or more deeper portions as the second image but having reduced artifacts; and
storing or displaying the third image or a further analysis thereof;
wherein the inverse calculation includes:

$$\min_y \|Ay - b\|^2$$

where:
A is a sparse matrix whose non-zero elements include pixel values of the first image,
b is the second image represented as a column-stack image, and
$y = [w\ x]^T$, w is a row stack representation of a weight matrix W, and x is a row stack representation of the third image; or
$y = [w\ x]^T$, w is a constant weight for all pixels values of the first image, and x is a row stack representation of the third image.

17. The method of claim 16, wherein the inverse calculation includes:

$$\min_y \|Ay - b\|^2 + \alpha\|\Gamma y\|^2$$

where $\alpha\|\Gamma y\|^2$ is a regularization term with operator $\Gamma$ and $\alpha \in [0,1]$, which controls the degree of artifacts removal or reduction in the third image.

18. The method of claim 16, further including:
calculating motion contrast information in the collected OCT image data using an OCT angiography (OCTA) processing technique; and
one or both of the first and second images is created from the motion contrast information.

19. A method to reduce artifacts in optical coherence tomography (OCT) images of the eye, said method comprising:
collecting OCT image data of the eye from an OCT system;
creating a first image and a second image based on the collected OCT image data, the first image depicting one or more upper portions and the second image depicting one or more deeper portions, wherein the second image contains artifacts;
using an inverse calculation, identifying a third image that can be mixed with the first image to generate the second image, said third image depicting the one or more deeper portions of the second image but having reduced artifacts;
storing or displaying the third image or a further analysis thereof;
wherein the inverse calculation includes the application of independent component analysis to the following formulation to identify a solution for $X_u$, and $X_l$ $$\begin{bmatrix} Y_u \\ Y_l \end{bmatrix} = A \begin{bmatrix} X_u \\ X_l \end{bmatrix}$$

where
$Y_u$ is a row stack representation of the first image,
$Y_l$ is a row stack representation of the second image,
$X_u$ is a row stack representation of a first unknown image,
$X_l$ is a row stack representation of a second unknown image,
A is a matrix that represents a linear mixing, and identifying $X_l$ as the third image.

20. A method as recited in claim 19, further including:
calculating motion contrast information in the collected OCT image data using an OCT angiography (OCTA) processing technique; and
one or both of the first and second images is created from the motion contrast information.

21. A method to reduce artifacts in optical coherence tomography (OCT) images of the eye, said method comprising:
collecting OCT image data of the eye from an OCT system;
creating a first image and a second image based on the collected OCT image data, the first image depicting one or more upper portions and the second image depicting one or more deeper portions, wherein the second image contains artifacts;
using an inverse calculation, determining a third image that can be mixed with the first image to generate the second image, said third image depicting the one or more deeper portions as the second image but having reduced artifacts as compared to the second image;

storing or displaying the third image or a further analysis thereof;

wherein the inverse calculation is based on the following minimization:

$$\min_w f(I_u, I_l - wI_u)$$

where $I_u$ is a vector representation of the first image, $I_l$ is a vector representation of the second image, w is a weight applied to the pixels of the first image, and f is an objective function that optimizes for w.

22. A method of claim 21, wherein f is based on one of the normalized cross correlation coefficient squared, the sum of squared differences, pattern intensity, or mutual information based on joint entropy.

* * * * *

UNITED STATES PATENT AND TRADEMARK OFFICE
CERTIFICATE OF CORRECTION

PATENT NO. : 10,636,145 B2
APPLICATION NO. : 16/522192
DATED : April 28, 2020
INVENTOR(S) : Homayoun Bagherinia et al.

It is certified that error appears in the above-identified patent and that said Letters Patent is hereby corrected as shown below:

On the Title Page

On the page 2, in item (60), in Column 1, in "Related U.S. Application Data", Line 1, delete "62/254,972," and insert -- 62/254,672, --, therefor.

In the Specification

In Column 2, Line 67, after ""(2015):" insert -- 4130-4143). --.

In Column 3, Line 16, delete "degeneration."Ophthalmology" and insert -- degeneration." Ophthalmology --, therefor.

In Column 6, Line 27, delete "$|A_3|$," and insert -- $|A_j|$, --, therefor.

In Column 11, Line 5, delete "a." and insert -- α. --, therefor.

In Column 16, Line 11, delete "α" and insert -- a --, therefor.

Signed and Sealed this
Sixth Day of October, 2020

Andrei Iancu
*Director of the United States Patent and Trademark Office*